(12) United States Patent
Koreeda et al.

(10) Patent No.: US 7,742,370 B2
(45) Date of Patent: *Jun. 22, 2010

(54) OBJECTIVE LENS AND OPTICAL INFORMATION READ/WRITE DEVICE

(75) Inventors: Daisuke Koreeda, Saitama-ken (JP); Koichi Maruyama, Tokyo (JP); Shuichi Takeuchi, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 1057 days.

This patent is subject to a terminal disclaimer.

(21) Appl. No.: 11/419,810

(22) Filed: May 23, 2006

(65) Prior Publication Data

US 2006/0280061 A1 Dec. 14, 2006

(30) Foreign Application Priority Data

May 23, 2005 (JP) ............................ P2005-149323

(51) Int. Cl.
*G11B 7/00* (2006.01)
(52) U.S. Cl. .............................. 369/44.23; 369/112.01; 369/112.03; 369/112.08; 369/112.23; 359/719
(58) Field of Classification Search ........................ None
See application file for complete search history.

(56) References Cited

U.S. PATENT DOCUMENTS

| | | | |
|---|---|---|---|
| 6,900,949 B2 | 5/2005 | Takeuchi et al. | |
| 6,982,838 B2 | 1/2006 | Maruyama et al. | |
| 7,035,193 B2 | 4/2006 | Takeuchi et al. | |
| 7,038,862 B2 | 5/2006 | Maruyama et al. | |
| 7,106,525 B2 * | 9/2006 | Takeuchi et al. | 359/719 |
| 2001/0050894 A1 * | 12/2001 | Takeuchi | 369/112.08 |
| 2004/0047269 A1 | 3/2004 | Ikenaka et al. | |
| 2004/0136096 A1 * | 7/2004 | Takeuchi et al. | 359/754 |
| 2004/0213131 A1 * | 10/2004 | Kimura et al. | 369/112.03 |
| 2004/0257958 A1 * | 12/2004 | Kimura et al. | 369/112.03 |
| 2005/0002118 A1 * | 1/2005 | Maruyama et al. | 359/719 |
| 2005/0007935 A1 * | 1/2005 | Sugi | 369/112.23 |
| 2005/0078593 A1 | 4/2005 | Maruyama et al. | |
| 2005/0157624 A1 | 7/2005 | Koreeda et al. | |
| 2005/0201250 A1 * | 9/2005 | Mimori et al. | 369/112.01 |
| 2005/0270958 A1 * | 12/2005 | Ikenaka | 369/112.23 |
| 2005/0281173 A1 | 12/2005 | Koreeda et al. | |

(Continued)

FOREIGN PATENT DOCUMENTS

JP 2004-247025 9/2004

*Primary Examiner*—Joseph H Feild
*Assistant Examiner*—Ifedayo Iluyomade
(74) *Attorney, Agent, or Firm*—Greenblum & Bernstein, P.L.C.

(57) ABSTRACT

An objective lens, for an optical information read/write device that performs read/write operations on each of a plurality of optical discs using a corresponding one of three laser beams having first, second, and third wavelengths $\lambda 1$, $\lambda 2$, and $\lambda 3$ (nm) satisfying a relationship $\lambda 1 < \lambda 2 < \lambda 3$, respectively, includes a phase shift structure having a plurality of ring-shaped refractive surface zones into which at least one surface of the objective lens is concentrically divided. The objective lens is made of material with an Abbe number vd satisfying a condition $40 \leq vd \leq 80$. The phase shift structure has a step between each couple of the adjacent refractive surface zones that gives an optical path difference to an incident laser beam, so that a condition $2N+1.00 < |\Delta OPD/\lambda 1| < 2N+1.30$ is satisfied, where $\Delta OPD$ represents the optical path difference (nm) that the step gives to the laser beam with the first wavelength, and N represents a non-negative integer.

47 Claims, 11 Drawing Sheets

U.S. PATENT DOCUMENTS

2006/0114796 A1 6/2006 Maruyama et al.
2006/0176578 A1* 8/2006 Kimura ...................... 359/719
2007/0014211 A1* 1/2007 Koreeda et al. .......... 369/44.37

* cited by examiner

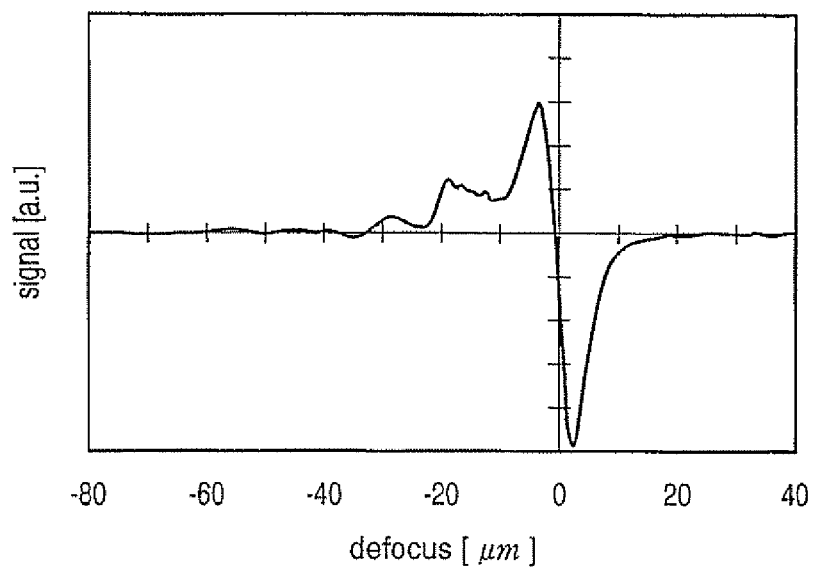
FIG. 9
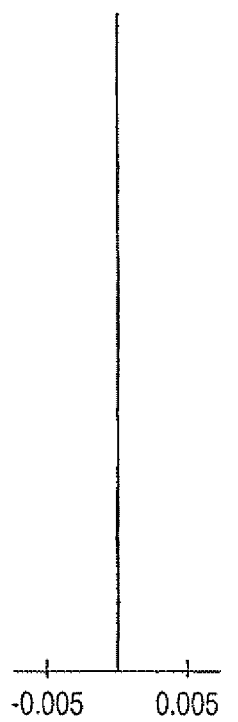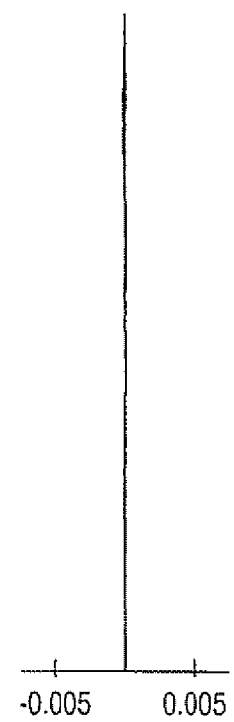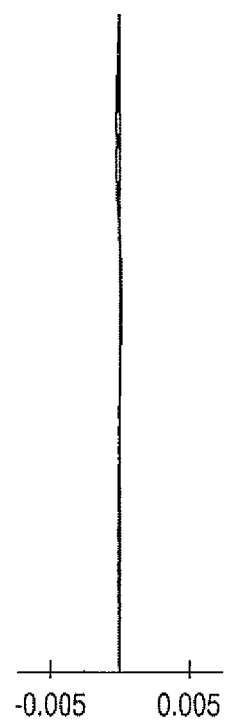
FIG.10A     FIG.10B     FIG.10C

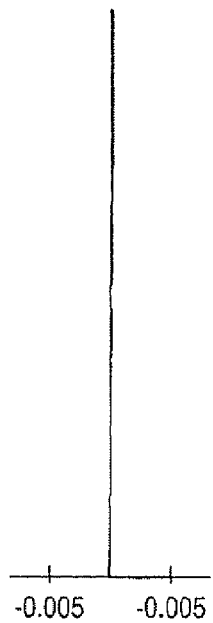 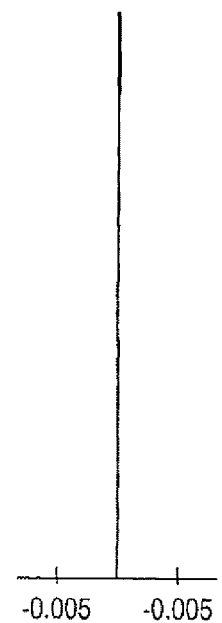 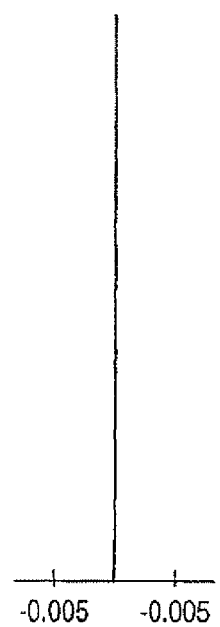
|  FIG.13A  |  FIG.13B  |  FIG.13C  |
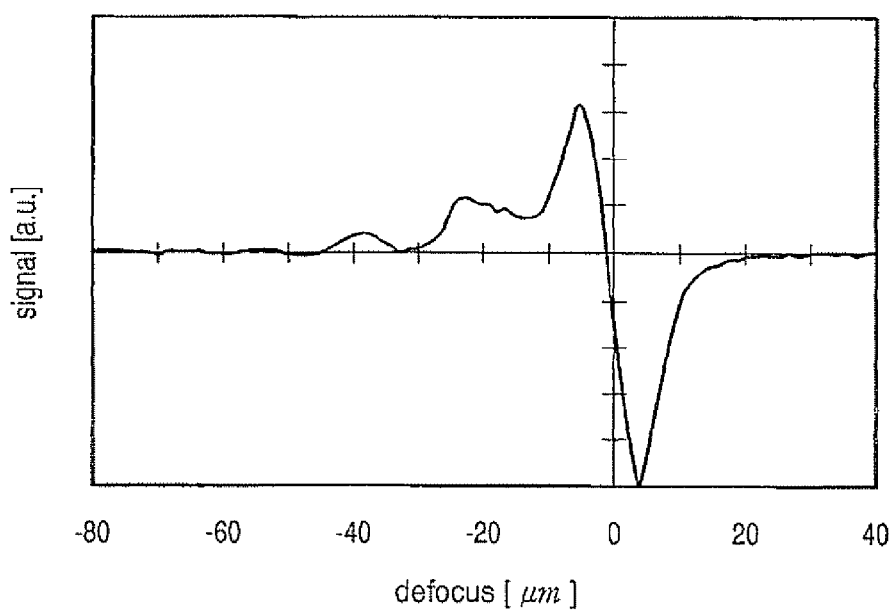
FIG.14

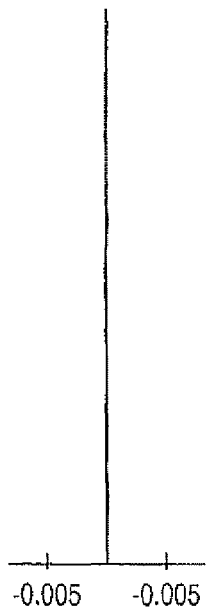
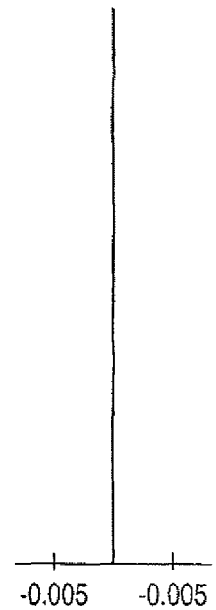
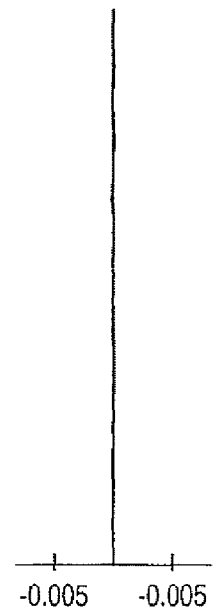
FIG.15A  FIG.15B  FIG.15C
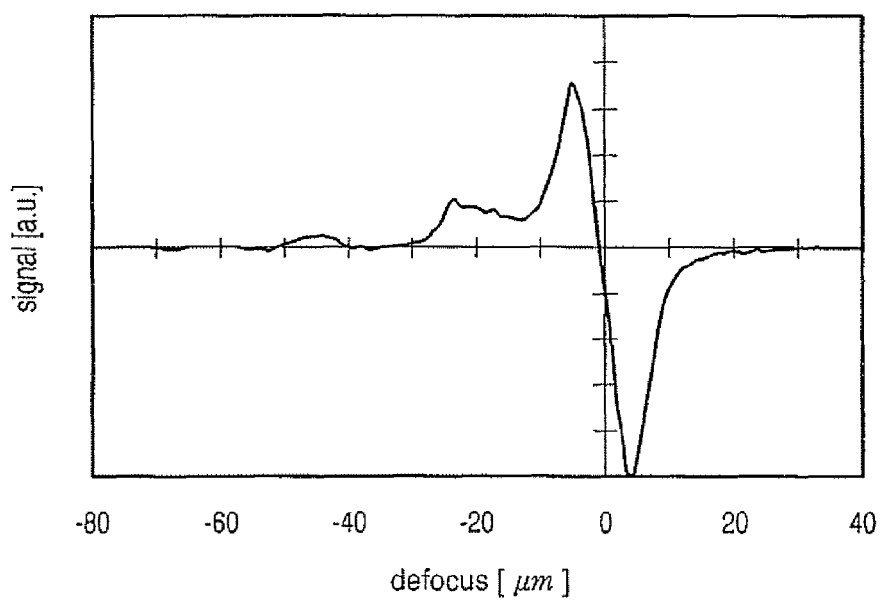
FIG.16

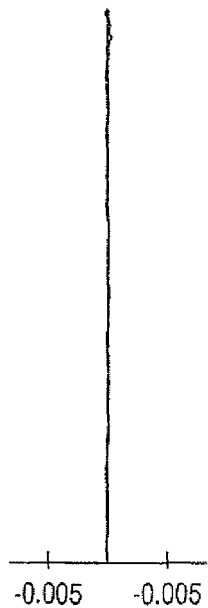 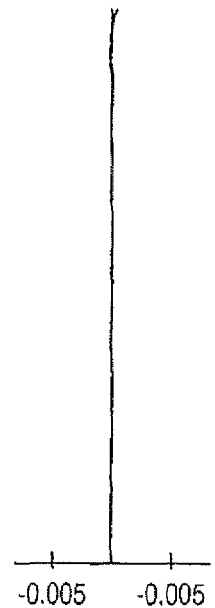 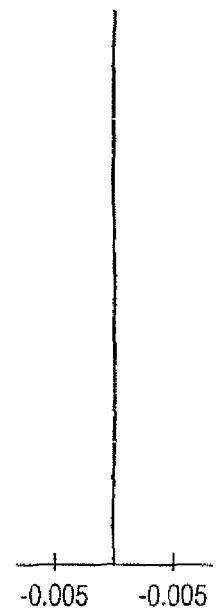
FIG.17A  FIG.17B  FIG.17C
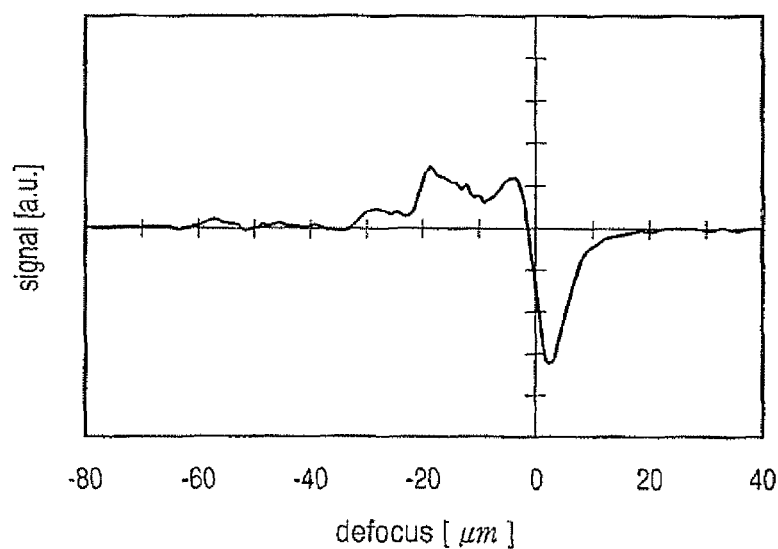
FIG.18
PRIOR ART

OBJECTIVE LENS AND OPTICAL INFORMATION READ/WRITE DEVICE

BACKGROUND OF THE INVENTION

The present invention relates to an optical information read/write device provided with a plurality of kinds of optical discs having, for example, different recording densities or different protective layer thicknesses, and an objective lens incorporated in the same.

Conventionally, there is a plurality of standards for optical discs such as a CD and a DVD that have different recording densities or different protective layer thicknesses. In addition, recently, in order to attain a higher capacity of information recording, a new standard of optical disc with a still higher recording density than that of the DVD is being brought into practical use. There are cited as the new standard of optical disc an HD DVD, and a BD (Blue-ray Disk). Such a new standard of optical disc has a protective layer whose thickness is equal to or thinner than that of the DVD. In this way, since there is the plurality of optical discs conforming to different standards, an optical information read/write device, more strictly, an objective optical system provided therein is currently required to ensure compatibility among the plurality of optical discs for the sake of user's convenience. It is noted that, in this specification, "optical information read/write devices" include all kinds of devices such as a device used only for reading the information, a device used only for writing the information, and a device used for both of reading and writing the information. Further, "to ensure compatibility" means that read/write operations for writing the information onto the optical disc and/or reading the information therefrom are ensured without exchanging any parts, even when an optical disc on which the operations are to be performed is changed.

In order to attain the device configured to ensure the compatibility among the plurality of optical discs conforming to the different standards, it is necessary to obtain a beam spot with a diameter corresponding to the different recording densities by changing a numerical aperture (NA) for light used in read/write operations for reading or writing the information, compensating spherical aberration that varies depending on a protective layer thickness. In general, the spot diameter of light with a shorter wavelength can be reduced smaller. For this reason, laser beams with different wavelengths are employed for the different recording densities in a conventional optical information read/write device. For example, a laser beam with a wavelength of about 790 nm is applied in use of the CD, while a laser beam with a wavelength of about 660 nm is applied in use of the DVD. In addition, in use of the new standard of optical disc, there is applied a laser beam that has a shorter wavelength than that of the DVD (e.g., a so-called blue laser with a wavelength of about 408 nm).

Moreover, a technique is brought into practical use, in which there is provided on any one surface of at least one optical element (e.g., objective lens) constituting the objective optical system a ring-shaped zone structure having a plurality of microscopic ring-shaped steps to converge each of the light beams with the different wavelengths on a recording surface of a corresponding one of the optical discs under an appropriate condition.

The aforementioned optical element is desired to be able to compensate the spherical aberration due to a wavelength shift, which is caused by the individual difference of a light source or an environmental variation such as a temperature change, from a design wavelength of the laser beam being used. It is noted that the "design wavelength" means a wavelength of each of the laser beams that is optimized for the read/write operations on each of the optical discs.

For example, such an objective lens as to ensure the compatibility among three kinds of optical discs such as the CD, DVD, and HD DVD as aforementioned is proposed in Japanese Patent Provisional Publication No. 2004-247025 (hereinafter, referred to as '025 Publication).

In '025 Publication, there is disclosed an optical pickup device that ensures the compatibility among three kinds of discs with different recording densities. More specifically, an objective lens incorporated in the optical pickup device is provided with a ring-shaped zone structure such that third-order diffracted light is used in read/write operations on an optical disc with a higher recording density, while second-order diffracted light is used in read/write operations on the DVD or the CD. Such an objective lens incorporated in the optical pickup device forms a suitable spot for the read/write operations on a recording surface of each of the optical discs. Thereby, there is provided the optical pickup device that ensures the compatibility among the three kinds of optical discs with the different recording densities.

However, in the optical pickup device disclosed in '025 Publication, only a light usage efficiency of about 40% is obtained in the read/write operations. In addition, unnecessary order diffracted light (first-order diffracted light in this case) is generated. Therefore, a problem arises that a waveform of a focus error signal is so deformed that a focusing function is deteriorated, or the beam spot cannot be converged to a predetermined diameter.

SUMMARY OF THE INVENTION

The present invention is advantageous in that an optical information read/write device and an objective lens used therefore are provided that, even in read/write operation performed on each of a plurality of optical discs conforming to different standards using a corresponding one of a plurality of light beams with different wavelengths, can form a suitable beam spot with spherical aberration being suppressed on a recording surface of each of the plurality of optical discs, prevent a focusing function from being deteriorated and reduce the beam spot to be of a desired diameter even when the objective lens includes such a phase shift structure that unnecessary order diffracted light is generated in use of the optical disc with a lower recording density, and further ensure high light usage efficiency even in use of the optical disc with a higher recording density.

According to an aspect of the present invention, there is provided an objective lens to be employed for an optical information read/write device that is configured to perform read/write operations for reading and/or writing information on each of a plurality of kinds of optical discs using a corresponding one of a plurality of kinds of laser beams having different wavelengths, the plurality of kinds of laser beams including three kinds of laser beams that have a first wavelength $\lambda 1$ (nm), a second wavelength $\lambda 2$ (nm), and a third wavelength $\lambda 3$ (nm) according to a relationship $\lambda 1 < \lambda 2 < \lambda 3$, respectively, the objective lens including a phase shift structure on at least one surface of the objective lens that has a plurality of ring-shaped refractive surface zones into which the at least one surface is concentrically divided. The objective lens is made of material with an Abbe number vd satisfying a condition: $40 \leqq vd \leqq 80$. The phase shift structure has a step between each couple of the adjacent refractive surface zones that gives an optical path difference to an incident laser beam. The phase shift structure is configured to satisfy a condition: $2N+1.00 < |\Delta OPD/\lambda 1| < 2N+1.30$, where $\Delta OPD$ represents the optical path difference (nm) that the step gives to the laser beam with the first wavelength λ1, and N represents a non-negative integer.

According to the objective lens configured as above, it is possible to ensure high compatibility among three kinds of optical discs that conforms to different standards, respectively. Especially, the objective lens configured as above can suppress the intensity of unnecessary order diffracted light generated in use of an optical disc with a relatively low recording density as a CD, so as to prevent a waveform of a focus error signal from being deformed.

Optionally, the phase shift structure maybe configured to satisfy a condition $3.04<|\Delta OPD/\lambda 1|<3.29$.

Optionally, the phase shift structure is configured to satisfy a condition $1.50<|\Delta OPD/\lambda 3|<1.62$.

Optionally, the phase shift structure may be configured to satisfy a condition $5.07<|\Delta OPD/\lambda 1|<5.25$.

Optionally, the phase shift structure may be configured to satisfy a condition $2.50<|\Delta OPD/\lambda 3|<2.58$.

According to some aspects, it is possible to achieve higher diffraction efficiency of the intended order diffracted light than that of unnecessary order diffracted light in use of the laser beam with the third wavelength. Moreover, it is possible to improve the diffraction efficiency for the laser beam with the second wavelength. It is noted that the "intended order diffracted light" means a diffraction order of diffracted light used for the read/write operations.

In addition, with the phase shift structure being configured as aforementioned, it is possible to suppress the intensity of the unnecessary order diffracted light of the laser beam with the third wavelength to improve the diffraction efficiency therefore, ensuring a high light intensity of laser beam with the first wavelength.

According to another aspect of the present invention, there is provided an objective lens to be employed for an optical information read/write device that is configured to perform read/write operations for reading and/or writing information on each of a plurality of kinds of optical discs using a corresponding one of a plurality of kinds of laser beams having different wavelengths, the plurality of kinds of laser beams including three kinds of laser beams that have a first wavelength λ1 (nm), a second wavelength λ2 (nm), and a third wavelength λ3 (nm) according to a relationship λ1<λ2<λ3, respectively, the objective lens including a phase shift structure on at least one surface of the objective lens that has a plurality of ring-shaped refractive surface zones into which the at least one surface is concentrically divided. The objective lens is a single lens made of material with an Abbe number vd satisfying a condition $20 \leq vd<40$. The phase shift structure has a step between each couple of the adjacent refractive surface zones that gives an optical path difference to an incident laser beam. The phase shift structure is configured to satisfy a condition $2N+0.70<|\Delta OPD/\lambda 1|<2N+1.25$, where ΔOPD represents the optical path difference (nm) that the step gives to the laser beam with the first wavelength λ1, and N represents a non-negative integer.

According to the objective lens configured as above, it is possible to ensure high compatibility among three kinds of optical discs that conforms to different standards, respectively. Especially, the objective lens configured as above can suppress the intensity of unnecessary order diffracted light generated in use of an optical disc with a relatively low recording density as a CD, so as to prevent a waveform of a focus error signal from being deformed.

Optionally, the phase shift structure may be configured to satisfy a condition $2.80<|\Delta OPD/\lambda 1|<3.10$.

Optionally, the phase shift structure may be configured to satisfy a condition $1.30<|\Delta OPD/\lambda 3|<1.47$.

Optionally, the phase shift structure may be configured to satisfy a condition $4.80<|\Delta OPD/\lambda 1|<5.20$.

Optionally, the phase shift structure may be configured to satisfy a condition $2.27<|\Delta OPD/\lambda 3|<2.46$.

According to some aspects, it is possible to achieve higher diffraction efficiency of the intended order diffracted light than that of unnecessary order diffracted light in use of the laser beam with the third wavelength. Moreover, it is possible to heighten the diffraction efficiency for the laser beam with the second wavelength further. It is noted that the "intended order diffracted light" means diffracted light of diffraction order used for the read/write operations.

In addition, with the phase shift structure being configured as aforementioned, it is possible to suppress the intensity of the unnecessary order diffracted light of the laser beam with the third wavelength to improve the diffraction efficiency therefore, ensuring a high light intensity of laser beam with the first wavelength.

According to another aspect of the present invention, there is provided an optical information read/write device configured to perform read/write operations for reading and/or writing information on each of a plurality of kinds of optical discs using a corresponding one of a plurality of kinds of laser beams having different wavelengths, the optical information read/write device including an objective lens that has a phase shift structure on at least one surface of the objective lens that has a plurality of ring-shaped refractive surface zones into which the at least one surface is concentrically divided. The plurality of kinds of laser beams includes three kinds of laser beams that have a first wavelength λ1 (nm), a second wavelength λ2 (nm), and a third wavelength λ3 (nm) according to a relationship λ1<λ2<λ3, respectively. The plurality of kinds of optical discs includes: a first optical disc with a protective layer whose thickness t1 is approximately 0.6 mm, on which the read/write operations are performed using the laser beam with the first wavelength λ1; a second optical disc with a protective layer whose thickness t2 is approximately 0.6 mm, on which the read/write operations are performed using the laser beam with the second wavelength λ2; and a third optical disc with a protective layer whose thickness is approximately 1.2 mm, on which the read/write operations are performed using the laser beam with the third wavelength λ3. The optical information read/write device is configured to satisfy relationships NA1>NA3 and NA2>NA3, where NA1, NA2, and NA3 represent numerical apertures necessary for the read/write operations on the first optical disc, the second optical disc, and the third optical disc, respectively. The optical information read/write device is configured such that the laser beams with the first and second wavelengths λ1 and λ2 are incident on the objective lens substantially as collimated light, and the laser beam with the third wavelength λ3 is incident on the objective lens as diverging light. The objective lens is made of material with an Abbe number vd satisfying a condition $40 \leq vd \leq 80$. The phase shift structure has a step between each couple of the adjacent refractive surface zones that gives an optical path difference to an incident laser beam. The phase shift structure is configured to satisfy a condition $2N+1.00<|\Delta OPD/\lambda 1|<2N+1.30$, in a first area configured to converge the laser beam with the third wavelength λ3 on a recording surface of the third optical disc, where ΔOPD (nm) represents the optical path difference that the step gives to the laser beam with the first wavelength λ1, and N represents a non-negative integer.

Here, the first optical disc corresponds to an optical disc that conforms to a new standard, more specifically, an HD DVD. In addition, for example, the second optical disc corresponds to a DVD. The third optical disc, for example, corresponds to a CD or a CD-R.

Optionally, conditions $-0.02<f1\times M1<0.02$, $-0.02<f2\times M2<0.02$, and $-0.12<f3\times M3<-0.04$ may be satisfied, where M1 and f1 represent an imaging magnification and a focal length in the read/write operations on the first optical disc, respectively, and M2 and f2 represent an imaging magnification and a focal length in the read/write operations on the second optical disc, respectively, and M3 and f3 represent an imaging magnification and a focal length in the read/write operations on the third optical disc, respectively. Further, the phase shift structure may be configured to satisfy a condition $3.04<|\Delta OPD/\lambda 1|<-0.04$.

It is noted that the first area is provided in the vicinity of an optical axis of the objective lens.

According to some aspects, it is possible to suppress the intensity of the unnecessary order diffracted light generated in use of the laser beam with the third wavelength, ensuring the light intensity of the laser beam with the first wavelength. In addition, it is possible to suppress spherical aberration in the read/write operations on each of the first, second, and third optical discs, so as to form an appropriate beam spot on the recording surface thereof.

Optionally, the phase shift structure may be configured to satisfy a condition $1.50<|\Delta OPD/\lambda 3|<1.62$.

Optionally, the phase shift structure may include a second area outside the first area. In this case, the second area may be configured to converge each of the laser beams with the first and second wavelengths on the recording surfaces of the first and second optical discs, and not to converge the laser beam with the third wavelength. Further, the second area may include a step between each couple of the adjacent refractive surface zones, the steps giving at least one kind of optical path difference to an incident laser beam. Furthermore, an absolute value of the at least one kind of optical path difference given by the steps in the second area is different from the optical path differences given by each of the steps in the first area.

Optionally, the optical information read/write device may be configured to satisfy a condition $f1\times NA1>f2\times NA2$, where f1 and f2 represent focal lengths in the read/write operations on the first and second optical discs, respectively. In this case, the phase shift structure may include a third area outside the second area. Further, the third area may be configured to converge only the laser beam with the first wavelength on the recording surface of the first optical disc, and not to converge the laser beams with the second and third wavelengths. Further, the third area may include a step between each couple of the adjacent refractive surface zones, the steps giving at least one kind of optical path difference to an incident laser beam. Further, an absolute value of the at least one kind of optical path difference given by the steps in the third area may be different from the absolute value of the at least one kind of optical path difference given by the steps in the second area.

Still optionally, the optical information read/write device may be configured to satisfy a condition $f1\times NA1<f2\times NA2$, where f1 and f2 represent focal lengths in the read/write operations on the first and second optical discs, respectively. In this case, the phase shift structure may include a third area outside the second area. Further, the third area may be configured to converge only the laser beam with the first wavelength on the recording surface of the first optical disc, and not to converge the laser beams with the second and third wavelengths. Further, the third area may include a step between each couple of the adjacent refractive surface zones, the steps giving at least one kind of optical path difference to an incident laser beam. Furthermore, an absolute value of the at least one kind of optical path difference given by the steps in the third area may be different from the absolute value of the at least one kind of optical path difference given by the steps in the second area.

According to a further aspect of the present invention, there is provided an optical information read/write device configured to perform read/write operations for reading and/or writing information on each of a plurality of kinds of optical discs using a corresponding one of a plurality of kinds of laser beams having different wavelengths, the optical information read/write device comprising an objective lens that has a phase shift structure on at least one surface of the objective lens that has a plurality of ring-shaped refractive surface zones into which the at least one surface is concentrically divided. The plurality of kinds of laser beams includes three kinds of laser beams that have a first wavelength $\lambda 1$ (nm), a second wavelength $\lambda 2$ (nm), and a third wavelength $\lambda 3$ (nm) according to a relationship $\lambda 1<\lambda 2<\lambda 3$, respectively. The plurality of kinds of optical discs includes: a first optical disc with a protective layer whose thickness t1 is approximately 0.6 mm, on which the read/write operations are performed using the laser beam with the first wavelength $\lambda 1$; a second optical disc with a protective layer whose thickness t2 is approximately 0.6 mm, on which the read/write operations are performed using the laser beam with the second wavelength $\lambda 2$; and a third optical disc with a protective layer whose thickness is approximately 1.2 mm, on which the read/write operations are performed using the laser beam with the third wavelength $\lambda 3$. The optical information read/write device is configured to satisfy relationships $NA1>NA3$ and $NA2>NA3$, where NA1, NA2, and NA3 represent numerical apertures necessary for the read/write operations on the first optical disc, the second optical disc, and the third optical disc, respectively. The optical information read/write device is configured such that the laser beams with the first and second wavelengths $\lambda 1$ and $\lambda 2$ are incident on the objective lens substantially as collimated light, and the laser beam with the third wavelength $\lambda 3$ is incident on the objective lens as diverging light. The objective lens is made of material with an Abbe number $vd$ satisfying a condition $20 \leq vd \leq 40$. The phase shift structure has a step between each couple of the adjacent refractive surface zones that gives an optical path difference to an incident laser beam. The phase shift structure is configured to satisfy a condition $2N+0.70<|\Delta OPD/\lambda 1|<2N+1.25$, in a first area configured to converge the laser beam with the third wavelength $\lambda 3$ on a recording surface of the third optical disc, where $\Delta OPD$ (nm) represents the optical path difference that the step gives to the laser beam with the first wavelength $\lambda 1$, and N represents a non-negative integer.

Optionally, the optical information read/write device may be configured to satisfy conditions $-0.02<f1\times M1<0.02$, $-0.02<f2\times M2<0.02$, and $-0.38<f3\times M3<-0.30$, where M1 and f1 represent an imaging magnification and a focal length in the read/write operations on the first optical disc, respectively, and M2 and f2 represent an imaging magnification and a focal length in the read/write operations on the second optical disc, respectively, and M3 and f3 represent an imaging magnification and a focal length in the read/write operations on the third optical disc, respectively. Still optionally, the phase shift structure may be configured to satisfy a condition $2.80<|\Delta OPD/\lambda 1|<3.10$.

Optionally, the phase shift structure may be configured to satisfy a condition $1.30<|\Delta OPD/\lambda 3|<1.47$.

According to a further aspect of the present invention, there is provided an optical information read/write device configured to perform read/write operations for reading and/or writing information on each of a plurality of kinds of optical discs using a corresponding one of a plurality of kinds of substantially collimated laser beams having different wavelengths, the optical information read/write device including an objective lens that has a phase shift structure on at least one surface of the objective lens that has a plurality of ring-shaped refractive surface zones into which the at least one surface is concentrically divided. The plurality of kinds of laser beams includes three kinds of laser beams that have a first wavelength $\lambda 1$ (nm), a second wavelength $\lambda 2$ (nm), and a third wavelength $\lambda 3$ (nm) according to a relationship $\lambda 1 < \lambda 2 < \lambda 3$, respectively. The plurality of kinds of optical discs includes: a first optical disc with a protective layer whose thickness t1 is approximately 0.6 mm, on which the read/write operations are performed using the laser beam with the first wavelength $\lambda 1$; a second optical disc with a protective layer whose thickness t2 is approximately 0.6 mm, on which the read/write operations are performed using the laser beam with the second wavelength $\lambda 2$; and a third optical disc with a protective layer whose thickness is approximately 1.2 mm, on which the read/write operations are performed using the laser beam with the third wavelength $\lambda 3$, and wherein the optical information read/write device is configured to satisfy relationships NA1>NA3 and NA2>NA3, where NA1, NA2, and NA3 represent numerical apertures necessary for the read/write operations on the first optical disc, the second optical disc, and the third optical disc, respectively. The objective lens is made of material with an Abbe number vd satisfying a condition $40 \leq vd \leq 80$. The phase shift structure has at least two kinds of steps, each of the steps between each couple of the adjacent refractive surface zones giving an optical path difference to an incident laser beam. The phase shift structure is configured to satisfy a condition $2N+1.00<|\Delta OPD/\lambda 1|<2N+1.30$, in a first area configured to converge the laser beam with the third wavelength $\lambda 3$ on a recording surface of the third optical disc, where $\Delta OPD1$ (nm) represents the optical path difference that at least one of the at least two kinds of steps give to the laser beam with the first wavelength $\lambda 1$, and N represents a non-negative integer.

When using a finite system of an optical system, off-axis aberrations such as coma aberration and astigmatism are generated in a tracking operation in which the objective lens is moved in a direction (circumferential direction of the optical disc) perpendicular to the optical axis direction. Due to the off-axis aberrations, it might be prevented to form a suitable beam spot on the recording surface of each of the optical discs. According to the optical information read/write device configured as above, there are provided in the first area that converges the laser beam with the third wavelength on the recording surface of the third optical disc at least two kinds of steps that give different optical path differences to the laser beam with the first wavelength, respectively. Thereby, each of the substantially collimated laser beams with the first, second, and third wavelength is allowed incident on the objective lens, so as to suppress the aberrations in the tracking operation.

Optionally, the phase shift structure may be configured to satisfy a condition $3.04<|\Delta OPD/\lambda 1|<3.29$.

Optionally, the phase shift structure may be configured to satisfy a condition $1.50<|\Delta OPD/\lambda 3|<1.62$.

Optionally, the phase shift structure may be configured to satisfy a condition $5.07<|\Delta OPD/\lambda 1|<5.25$.

Optionally, the phase shift structure may be configured to satisfy a condition $2.50<|\Delta OPD/\lambda 3|<2.58$.

With the phase shift structure being configured as above, it is possible to suppress the intensity of the unnecessary order diffracted light generated in use of the laser beam with the third wavelength, ensuring a high light intensity of laser beam with the first wavelength. Further, it is possible to improve the diffraction efficiency for the laser beam with the third wavelength, so as to improve light usage efficiency as a whole of the optical information read/write device.

Further optionally, the phase shift structure may be configured to satisfy a condition $2N-0.20<|\Delta OPD2/\lambda 1|<2N+0.20$, where $\Delta OPD2$ represents an optical path difference that the other of the at least two kinds of steps give to the laser beam with the first wavelength $\lambda 1$.

Thereby, it is possible to ensure high diffraction efficiency in the read/write operations using each of the laser beams with the first, second, and third wavelengths.

Optionally, the phase shift structure may be configured to satisfy a condition $1.80<|\Delta OPD2/\lambda 1|<2.20$.

Thereby, it is possible to ensure a high light intensity of laser beam to be converged on the recording surface in use of any of the optical discs.

Optionally, the phase shift structure may include a second area outside the first area. In this case, the second area may be configured to converge each of the laser beams with the first and second wavelengths on the recording surfaces of the first and second optical discs, and not to converge the laser beam with the third wavelength. Further, the second area may include a step between each couple of the adjacent refractive surface zones, the steps giving at least one kind of optical path difference to an incident laser beam. Furthermore, an absolute value of a ratio of the at least one kind of optical path difference given by the steps in the second area to the wavelength $\lambda 1$ of the first laser beam may be different from the $|\Delta OPD2/\lambda 1|$.

According to a further aspect of the present invention, there is provided an optical information read/write device configured to perform read/write operations for reading and/or writing information on each of a plurality of kinds of optical discs using a corresponding one of a plurality of kinds of substantially collimated laser beams having different wavelengths, the optical information read/write device comprising an objective lens that has a phase shift structure on at least one surface of the objective lens that has a plurality of ring-shaped refractive surface zones into which the at least one surface is concentrically divided. The plurality of kinds of laser beams includes three kinds of laser beams that have a first wavelength $\lambda 1$ (nm), a second wavelength $\lambda 2$ (nm), and a third wavelength $\lambda 3$ (nm) according to a relationship $\lambda 1 < \lambda 2 < \lambda 3$, respectively. The plurality of kinds of optical discs includes: a first optical disc with a protective layer whose thickness t1 is approximately 0.6 mm, on which the read/write operations are performed using the laser beam with the first wavelength $\lambda 1$; a second optical disc with a protective layer whose thickness t2 is approximately 0.6 mm, on which the read/write operations are performed using the laser beam with the second wavelength $\lambda 2$; and a third optical disc with a protective layer whose thickness is approximately 1.2 mm, on which the read/write operations are performed using the Laser beam with the third wavelength $\lambda 3$. The optical information read/write device is configured to satisfy relationships NA1>NA3 and NA2>NA3, where NA1, NA2, and NA3 represent numerical apertures necessary for the read/write operations on the first optical disc, the second optical disc, and the third optical disc, respectively. The objective lens is made of material with an Abbe number vd satisfying a condition $20 \leq vd < 40$. The phase shift structure has at least two kinds of steps, each of the steps between each couple of the adjacent refractive surface zones giving an optical path difference to an incident laser beam. The phase shift structure is configured to satisfy a condition $2N+0.70<|\Delta OPD1/\lambda 1|<2N+1.25$, in a first area configured to converge the laser beam with the third wavelength λ3 on a recording surface of the third optical disc, where ΔOPD1 (nm) represents the optical path difference that at least one of the at least two kinds of steps give to the laser beam with the first wavelength λ1, and N represents a non-negative integer.

Optionally, the phase shift structure may be configured to satisfy a condition 2.80<|ΔOPD1/λ1|<3.10.

Optionally, the phase shift structure may be configured to satisfy a condition 1.30<|ΔOPD1/λ3|<1.47.

Optionally, the phase shift structure may be configured to satisfy a condition 4.80<|ΔOPD/λ1|<5.20.

Optionally, the phase shift structure may be configured to satisfy a condition 2.27<|ΔOPD1/λ3|<2.46.

According to some aspects, it is possible to suppress the intensity of the unnecessary order diffracted light generated in use of the laser beam with the third wavelength, ensuring a high light intensity of laser beam with the first wavelength. In addition, it is possible to suppress the spherical aberration in the read/write operations on each of the first, second, and third optical discs to form a suitable beam spot on the recording surface thereof. Further, it is possible to improve the diffraction efficiency for the laser beam with the third wavelength to improve light usage efficiency as a whole of the optical information read/write device.

In some aspects, each of the substantially collimated laser beams with the first, second, and third wavelength is allowed incident on the objective lens, so as to suppress the aberrations in the tracking operation.

BRIEF DESCRIPTION OF THE ACCOMPANYING DRAWINGS

FIG. 1 schematically shows a configuration of an optical information read/write device with an objective lens incorporated therein in a first embodiment according to one or more aspects of the present invention;

FIGS. 2A, 2B, and 2C schematically show an objective lens and respective optical discs on respective optical paths from respective light sources to the respective optical discs in the first embodiment according to one or more aspects of the present invention;

FIG. 3 is an enlarged view of a phase shift structure provided on a first surface of the objective lens in the first embodiment and a second embodiment according to one or more aspects of the present invention;

FIGS. 4A, 4B, and 4C schematically show an objective lens and respective optical discs on respective optical paths from respective light sources to the respective optical discs in the second embodiment according to one or more aspects of the present invention;

FIG. 9 is a graph showing a focus error signal detected in use of a third laser beam in the optical information read/write device in a practical example 1 according to one or more aspects of the present invention;

Figure 11:
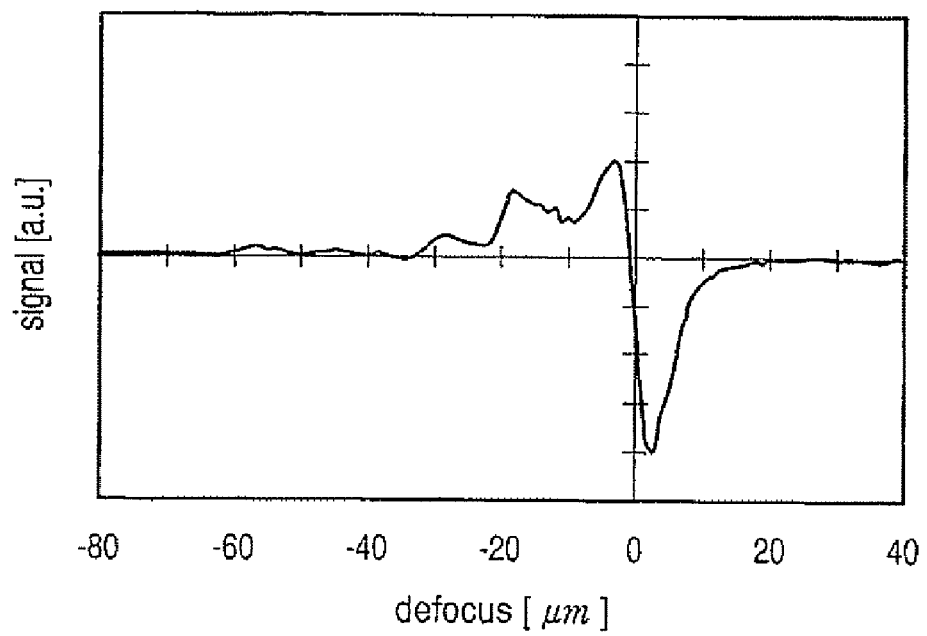
Figure 12:
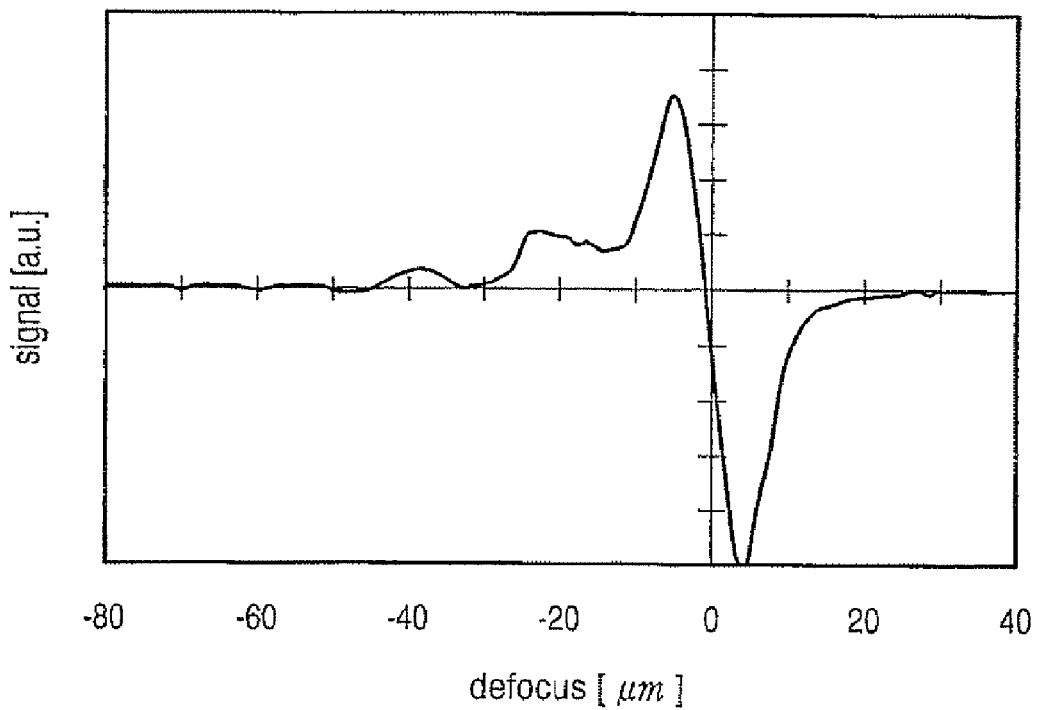

FIGS. 10A, 10B, and 10C are graphs showing spherical aberrations generated in use of first, second, and third laser beams in the optical information read/write device in the practical example 1 according to one or more aspects of the present invention, respectively;

FIG. 11 is a graph showing a focus error signal detected in use of the third laser beam in the optical information read/write device in a practical example 2 according to one or more aspects of the present invention;

FIG. 12 is a graph showing a focus error signal detected in use of the third laser beam in the optical information read/write device in a practical example 3 according to one or more aspects of the present invention;

FIGS. 13A, 13B, and 13C are graphs showing spherical aberrations generated in use of the first, second, and third laser beams in the optical information read/write device in the practical example 3 according to one or more aspects of the present invention, respectively;

FIG. 14 is a graph showing a focus error signal detected in use of the third laser beam in the optical information read/write device in a practical example 4 according to one or more aspects of the present invention;

FIGS. 15A, 15B, and 15C are graphs showing spherical aberrations generated in use of the first, second, and third laser beams in the optical information read/write device in the practical example 4 according to one or more aspects of the present invention, respectively;

FIG. 16 is a graph showing a focus error signal detected in use of the third laser beam in the optical information read/write device in a practical example 5 according to one or more aspects of the present invention;

FIGS. 17A, 17B, and 17C are graphs showing spherical aberrations generated in use of the first, second, and third laser beams in the optical information read/write device in the practical example 5 according to one or more aspects of the present invention, respectively; and FIG. 18 is a graph showing a focus error signal detected in use of the third laser beam in the optical information read/write device in a comparative example 5 according to one or more aspects of the present invention.

DETAILED DESCRIPTION OF THE EMBODIMENTS

Hereinafter, referring to the accompanying drawings, an objective lens in each of embodiments according to one or more aspects of the present invention will be described. An objective lens in each of embodiments, which is incorporated in an optical information read/write device, ensures compatibility among three kinds of optical discs that are different in specifications such as protective layer thickness and recording density.

Hereinafter, for the sake of simplicity of explanation, an optical disc of the highest recording density (for example, an optical disc of a new standard such as an HD DVD and BD) is referred to as a first optical disc D1. An optical disc of the second highest recording density (for example, a DVD, DVD-R etc.) is referred to as a second optical disc D2. An optical disc of the lowest recording density (for example, a CD, CD-R etc.) is referred to as a third optical disc D3.

In the embodiments, the protective layer thicknesses of the optical discs D1, D2, and D3 are represented as t1, t2, and t3, respectively. The thicknesses of t1, t2, and t3 have the following values.

t1≅0.6 mm
t2≅0.6 mm
t3≅1.2 mm

In addition, when read/write operations for writing information onto the optical disc and/or reading the information therefrom are performed on each of the optical discs D1 to D3, an NA (Numerical Aperture) is required to be changed to obtain a beam spot with a suitable diameter for the recording density of each of the optical discs. Here, when optimum design NAs necessary for the read/write operations on the optical discs D1 to D3 are represented as NA1, NA2, and NA3, respectively, relationship among the NA1, NA2, and NA3 is as follows:

NA1>NA3 and NA2>NA3

Namely, in the read/write operations on each of the first and second optical discs D1 and D2 with the higher recording densities than that of the third optical disc D3, since it is necessary to form a smaller beam spot, a higher NA is required. Meanwhile, in the read/write operations on the third optical disc D3 with the lowest recording density, a required NA is smaller. It is noted that any of the optical discs is mounted on a turntable (not shown) to be rotated in the read/write operations.

When each of the optical discs D1 to D3 with the different recording densities is used as aforementioned, a corresponding one of laser beams with different wavelengths is applied in the optical information read/write device to obtain a beam spot with a suitable diameter for the recording density of each of the optical discs. More specifically, in the read/write operations on the first optical disc D1, a laser beam (hereinafter, referred to as a "first laser beam") with the shortest wavelength (a first wavelength) is emitted from a light source to form a beam spot of the smallest diameter on a recording surface of the first optical disc D1. Moreover, in the read/write operations on the third optical disc D3, a laser beam (hereinafter, referred to as a "third laser beam") with the longest wavelength (a third wavelength) is emitted from a light source to form a beam spot of the largest diameter on a recording surface of the third optical disc D3. Further, in the read/write operations on the second optical disc D2, a laser beam (hereinafter, referred to as a "second laser beam") with the second shortest wavelength (a second wavelength) is emitted from a light source to form a beam spot of the second shortest diameter on a recording surface of the second optical disc D2.

First Embodiment

Figure 1:
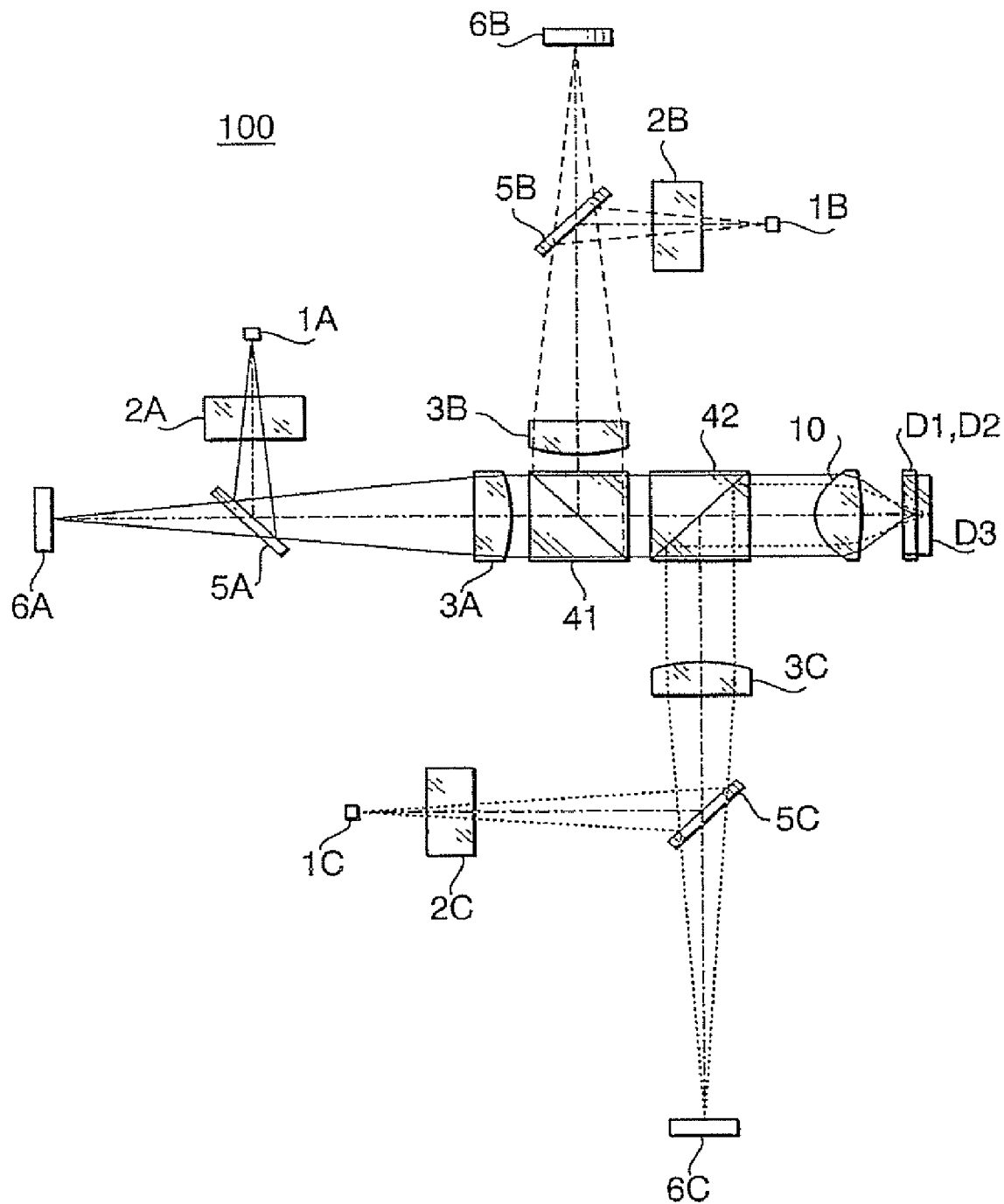

FIG. 1 schematically shows a configuration of an optical information read/write device 100 with an objective lens 10 incorporated therein in a first embodiment according to one or more aspects of the present invention. The optical information read/write device 100 includes a light source 1A that emits the first laser beam, a light source 1B that emits the second laser beam, a light source 1C that emits the third laser beam, diffraction gratings 2A, 23, and 2C, coupling lenses 3A, 3B, and 3C, beam splitters 41, and 42, half mirrors 5A, 5B, and 5C, and light receiving portions 6A, 6B, and 6C. It is noted that the optical information read/write device 100 has to meet a requirement that a suitable NA is necessary for each of the aforementioned optical discs being used. Therefore, the optical information read/write device 100 may include an aperture-regulating element (not shown) for regulating the diameter of the third laser beam.

As shown in FIG. 1, the first and second laser beams emitted from the light sources 1A and 1B, respectively are introduced to a common light path via the beam splitter 41 after passing through the coupling lenses 3A and 3B, respectively, so as to be incident on the objective lens 10. Meanwhile, the third laser beam emitted from the light sources 1C is introduced to the common light path via the coupling lens 3C and the beam splitter 42, so as to be incident on the objective lens 10. Each of the laser beams passing through the objective lens 10 is converged in the vicinity of the recording surface of a corresponding one of the optical discs D1 to D3 on which the read/write operations are to be performed. Each of the laser beams reflected on the recording surface is deflected by a corresponding one of the half mirrors 5A to 5C to be detected by the light receiving portions 6A to 6C.

Figure 2A:
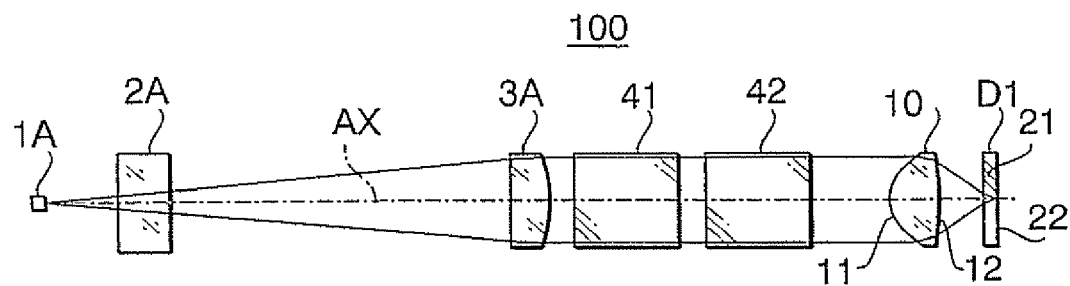
Figure 2B:
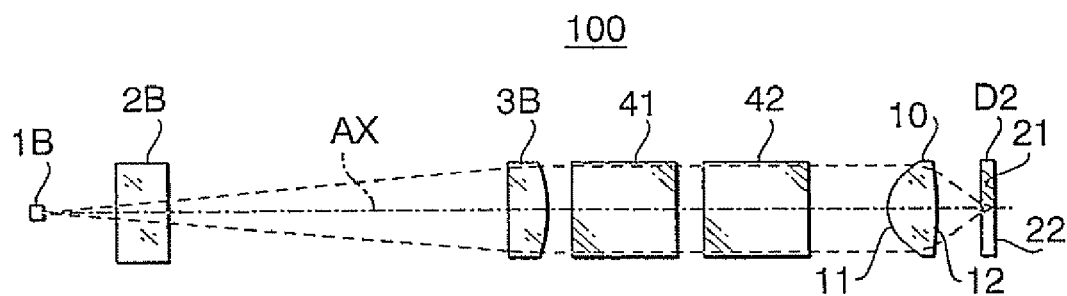
Figure 2C:
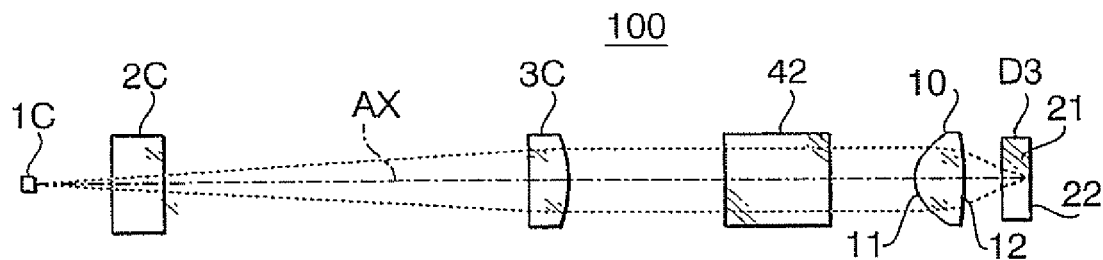

FIGS. 2A, 2B, and 2C schematically show the objective lens 10 and the respective optical discs D1, D2, and D3 on the respective optical paths from the respective light sources to the respective optical discs. In each of FIGS. 2A, 2B, and 2C, a reference axis AX of the optical information read/write device 100 is indicated by an alternate long and short dash line. In a situation as shown in each of FIGS. 2A to 2C, an optical axis of the objective lens 10 conforms to the reference axis AX, yet the optical axis of the objective lens 10 might be shifted due to a tracking operation. The positional relationship between the reference axis AX and the optical axis is the same as that in the below-mentioned second embodiment (see FIG. 4).

The objective lens 10 has a first surface 11 and a second surface 12 in the order from a side of the light source. As shown in FIGS. 2A to 2C, the objective lens 10 is configured as a single biconvex lens made of plastic of which both of the first and second surfaces 11 and 12 are aspheric. When a distance (SAG amount) between a coordinate point on the aspheric surface at a height of "h" from the optical axis and a plane tangent to the aspheric surface on the optical axis is represented as "X(h)", a curvature (1/r) of the aspheric surface on the optical axis is represented as "C", a conical coefficient is "K", and a 2i-th order aspheric coefficient is "$A_{2i}$", a shape of the aspheric surface can be represented by the following equation (A).

$$X(h) = \frac{Ch^2}{1+\sqrt{1-(K+1)C^2h^2}} + \sum_{i=2} A_{2i}h^{2i} \quad (A)$$

In addition, each of the optical discs D1 to D3 has a protective layer 21 and a recording surface 22. It is noted that, in each of the actual optical discs D1 to D3, the recording surface 22 is sandwiched between the protective layer 21 and a label layer (not shown).

When the laser beam with a wavelength corresponding to each of the optical discs D1 to D3 being used are employed as the optical information read/write device 100, a spherical aberration varies due to a change of the refractive index of the objective lens and/or difference of the protective layer thickness among the optical discs D1 to D3. In order to allow the optical information read/write device 100 to ensure the compatibility among the optical discs D1 to D3, it is necessary to sufficiently compensate the spherical aberration caused by using any of the optical discs D1 to D3. Therefore, there is provided on at least one surface (the first surface 11 in this embodiment) of the objective lens 10 a phase shift structure that has a plurality of ring-shaped refractive surfaces into which the at least one surface is concentrically divided and a plurality of microscopic steps formed between a couple of any adjacent refractive surface zones. Each of the plurality of microscopic steps is configured to give a predetermined optical path difference to the incident laser beam.

Figure 3:
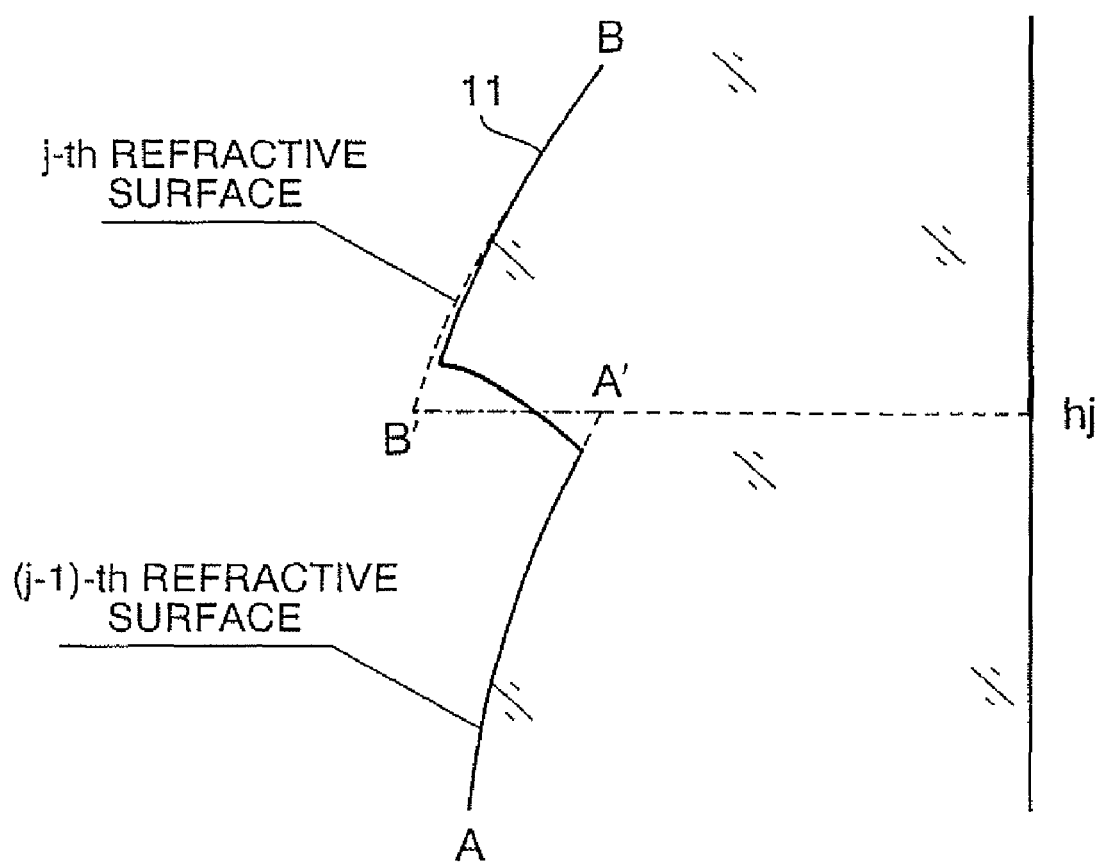

FIG. 3 is an enlarged view of the phase shift structure provided on the first surface 11. As shown in FIG. 3, the optical path difference is defined as difference between a optical path length that is evaluated to an image plane caused by refraction on a boundary line (hj) on a virtual extension plane (A-A' plane) obtained by elongating the shape of a (j−1)-th refractive surface in a direction away from the optical axis and a optical path length that is evaluated to an image plane caused by refraction on a boundary line (hj) on a virtual extension plane (B-B' plane) obtained by elongating the shape of a j-th refractive surface in a direction close to the optical axis.

The phase shift structure shown in FIG. 3 has such a property as to control the spherical aberration generated at a refractive lens portion of the objective lens 10 due to the difference between the wavelengths of the first and second laser beams. In addition, each of the steps of the phase shift structure is designed such that the optical path difference given to the first laser beam is a predetermined value based upon an Abbe number of the objective lens 10. Thereby, the read/write operations on the third optical disc D3 can be performed without deteriorating a focusing function especially in use of the third optical disc D3.

More specifically when using the objective lens 10 with the Abbe number vd satisfying the following condition (1), the phase shift structure is designed such that the optical path difference ΔOPD given to the first laser beam by each of the steps constituting the phase shift structure satisfies the following condition (2):

$$40 \leq vd \leq 80 \quad (1)$$

$$2N+1.00 < |\Delta OPD/\lambda 1| < 2N+1.30 \quad (2)$$

where N is a non-negative integer. The same applies to N used in each of conditions shown below.

When |ΔOPD| is over the upper limit of the condition (2), it causes such an undesirable state that the light intensity of the first laser beam is reduced. In addition when |ΔOPD| is less than the lower limit of the condition (2), it causes such an undesirable state that the intensity of an unnecessary order diffracted light of the third laser beam is increased to deteriorate the focusing function.

More specifically, the aforementioned steps that give the optical path difference to the first laser beam are designed to satisfy the following condition (3) or (5).

$$3.04 < |\Delta OPD/\lambda 1| < 3.29 \quad (3)$$

$$5.07 < |\Delta OPD/\lambda 1| < 5.25 \quad (5)$$

Moreover, in order to ensure higher diffraction efficiency of intended order diffracted light of the third laser beam than that of unnecessary order diffracted light thereof, the aforementioned steps satisfying the condition (2) are designed to satisfy the following condition (4) or (6). More specifically, the aforementioned steps satisfying the condition (3) is desired to be designed to satisfy the following condition (4), and the steps satisfying the condition (5) is desired to be designed to satisfy the following condition (6). It is noted that the phase shift structure is preferred to satisfy both of the conditions (3) and (4), yet may be designed to satisfy at least one of the conditions (3) and (4). The same applies to the conditions (5) and (6).

$$1.50 < |\Delta OPD/\lambda 3| < 1.62 \quad (4)$$

$$2.50 < |\Delta OPD/\lambda 3| < 2.58 \quad (6)$$

The objective lens 10 is usually arranged on the reference axis AX of the optical information read/write device 100. However, in the read/write operations, the objective lens 10 sometimes deviates from a position on the reference axis AX due to a tracking shift. In this case, the aberration is not generated when collimated light is incident on the objective lens 10. However, when non-collimated light such as diverging light and converging light is incident on the objective lens 10, off-axis aberrations such as coma aberration and astigmatism are generated. Generally, the optical disc on which a high NA is required in the read/write operations has a narrower allowable range with respect to each of the aberrations. Accordingly, when using the optical disc on which the high NA is required in the read/write operations, it is desired that substantially collimated light is incident on the objective lens 10, so as to prevent various kinds of aberrations caused by the off-axis light being incident on the objective lens even though the objective lens 10 deviates from the position on the reference axis AX due to the tracking shift.

For example, the objective lens 10 having the phase shift structure designed to satisfy the aforementioned conditions (3) or (4) is designed to satisfy the following conditions (13) and (14).

$$-0.02 < f1 \times M1 < 0.02 \quad (13)$$

$$-0.02 < f2 \times M2 < 0.02 \quad (14)$$

It is noted that M1 and f1 represent an imaging magnification and a focal length of the objective lens 10 in use of the first optical disc D1, respectively, and M2 and f2 represent an imaging magnification and a focal length of the objective lens 10 in use of the second optical disc D2, respectively.

By that the objective lens 10 is designed to satisfy the conditions (13) and (14), the light employed in use of the first optical disc D1 or the second optical disc D2 becomes substantially collimated light. Therefore, it is possible to sufficiently reduce the coma aberration or the astigmatism caused by the tracking shift to a negligibly small extent.

It is noted that, in the first embodiment, the imaging magnification M1 or M2 of the objective lens 10 is caused to be zero by arranging the first and second light sources 1A and 1B such that the laser beam emitted from each of the first and second light sources 1A and 1B is converted into the collimated light by a corresponding one of the coupling lenses 3A and 3B. Namely, each of the coupling lenses 3A and 3B in the first embodiment serves as a collimating lens for a corresponding one of the first and second laser beams.

As aforementioned, when the objective lens 10 is designed to efficiently reduce the aberrations in use of each of the optical discs D1 and D2 with the narrow allowable range with respect to each of the aberrations, the spherical aberration generated in the read/write operations on the third optical disc D3 cannot sufficiently be reduced only by the performance of the objective lens 10. For this reason, the spherical aberration generated in use of the third optical disc D3 is compensated by causing the incident light on the objective lens 10 to be the diverging light as shown in FIG. 2C. More specifically, when the imaging magnification and the focal length of the objective lens 10 in use of the third optical disc D3 are represented as M3 and f3, respectively, the objective lens 10 is designed to satisfy the following condition (15).

$$-0.12 < f3 \times M3 < -0.04 \quad (15)$$

When the value of "f3×M3" is over the upper limit of the condition (15), it causes such an undesirable state that an overcorrected spherical aberration remains in use of the third optical disc D3. Meanwhile, when the value of "f3×M3" is less than the lower limit of the condition (15), it causes such an undesirable state that an undercorrected spherical aberration is generated in use of the third optical disc D3. With the objective lens 10 being designed to satisfy the condition (15), it is possible to reduce the spherical aberration generated in use of the third optical disc D3.

Here, when the phase shift structure is designed such that the optical path difference given by each of the steps satisfies the aforementioned condition (3), more specifically, is about three times as long as the wavelength of the first laser beam, it is possible to reduce the spherical aberration due to the disc thickness difference between the first optical disc D1 and the third optical disc D3. Therefore, a diverging angle of the third laser beam incident on the objective lens 10 can be made small compared with the case where the optical path difference given by each of the steps is 2K times as long as the wavelength of the first laser beam (K represents a positive integer. Same is applied hereinafter.)

When the objective lens whose Abbe number satisfies the following condition (7) is employed, the phase shift structure is designed such that the optical path difference ΔOPD, given to the first laser beam by each of the steps constituting the phase shift structure, satisfies the following condition (8).

$$20 \leq vd \leq 40 \tag{7}$$

$$2N+0.70 < |\Delta OPD/\lambda 1| < 2N+1.25 \tag{8}$$

When the value of |ΔOPD/λ1| exceeds the upper limit of the condition (8), it causes such an undesirable state that the intensity of the unnecessary order diffracted light of the third laser beam is increased. When the value of |ΔOPD/λ1| is less than the lower limit of the condition (8), it causes such an undesirable state that the light intensity of the first laser beam is reduced.

More specifically, the aforementioned steps that give the optical path difference to the first laser beam are designed to satisfy the following condition (9) or (11).

$$2.80 < |\Delta OPD/\lambda 1| < 3.10 \tag{9}$$

$$4.80 < |\Delta OPD/\lambda 1| < 5.20 \tag{11}$$

Further, in order to ensure higher diffraction efficiency of the intended order diffracted light of the third laser beam than that of the unnecessary order diffracted light thereof, the aforementioned steps satisfying the condition (8) are designed to satisfy the following condition (10) or (12). More specifically, the aforementioned steps satisfying the condition (9) is desired to be designed to satisfy the following condition (10), and the steps satisfying the condition (11) is desired to be designed to satisfy the following condition (12). It is noted that the phase shift structure is preferred to satisfy both of the conditions (9) and (10), yet may be designed to satisfy at least one of the conditions (9) and (10). The same applies to the conditions (11) and (12).

$$1.30 < |\Delta OPD/\lambda 3| < 1.47 \tag{10}$$

$$2.27 < |\Delta OPD/\lambda 3| < 2.46 \tag{12}$$

As aforementioned, in use of the optical disc on which the high NA is required in the read/write operations, it is preferred to let the substantially collimated light incident on the objective lens 10. In addition, the objective lens 10 is required to sufficiently compensate the spherical aberration generated in the read/write operations on the third optical disc D3. Accordingly, for example, the objective lens 10 that has the phase shift structure designed to satisfy the aforementioned condition (9) or (10) is designed to satisfy the aforementioned conditions (13) and (14), and the following condition (16).

$$-0.38 < f3 \times M3 < -0.30 \tag{16}$$

The optical information read/write device 100 is configured as aforementioned depending on the value of the Abbe number vd. Thereby, as shown in FIGS. 2A, 2B, and 2C, in the read/write operations on each of the optical discs D1 to D3, the laser beam, emitted from one of the light sources corresponding to the optical disc being used, is converged via a corresponding one of the coupling lens 3A to 3C, a corresponding one of the beam splitters 41 and 42, and the objective lens 10, so as to form the suitable beam spot for the read/write operations. In addition, it is possible to prevent the unnecessary order diffracted light from being generated in use of the third optical disc D3, so as to keep the focusing function favorable.

Second Embodiment

Figure 4A:
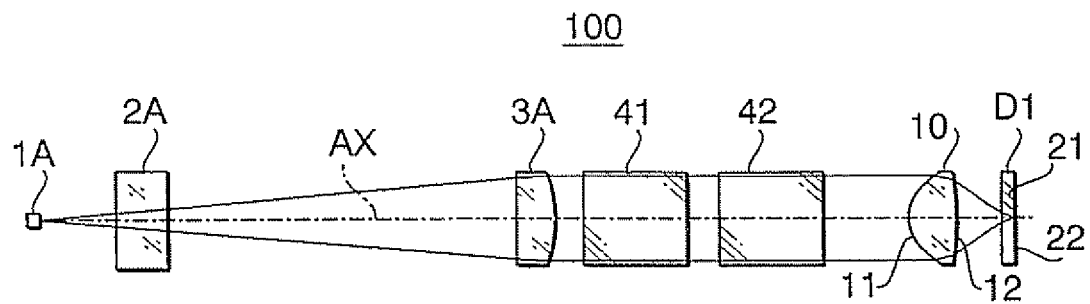
Figure 4B:
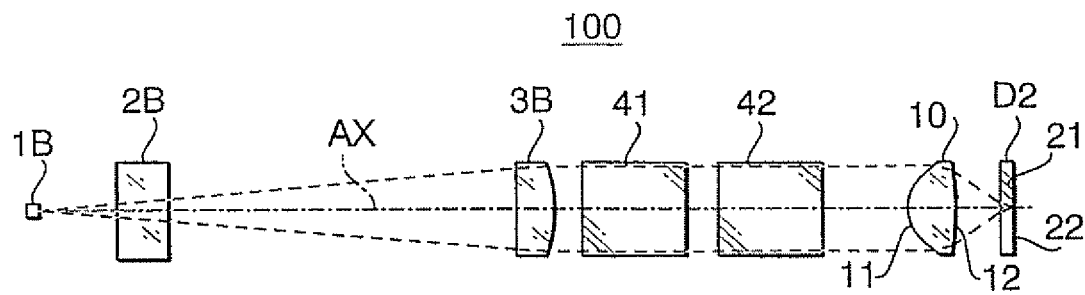
Figure 4C:
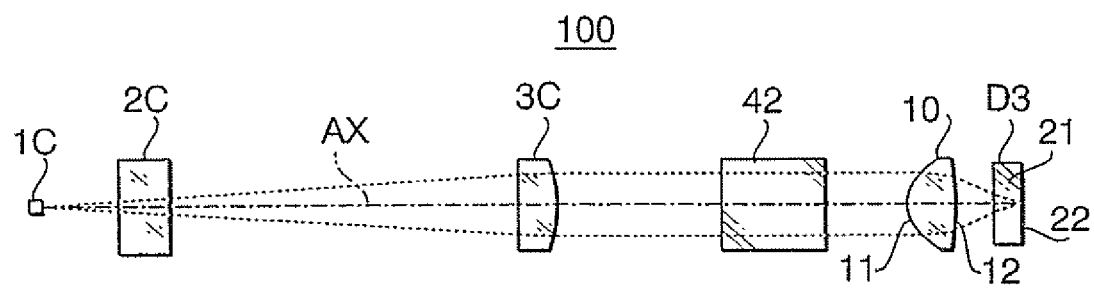
Figure 5:
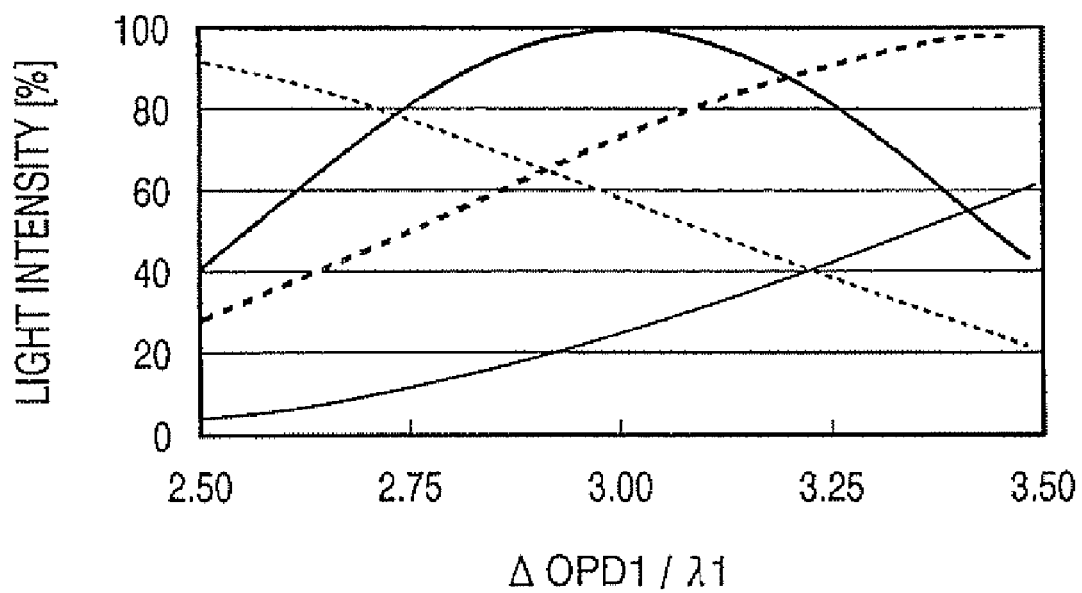
FIG. 5 is a graph showing diffraction efficiency for explaining effects in the case where a condition (23) is satisfied in the second embodiment according to one or more aspects of the present invention.
Figure 6:
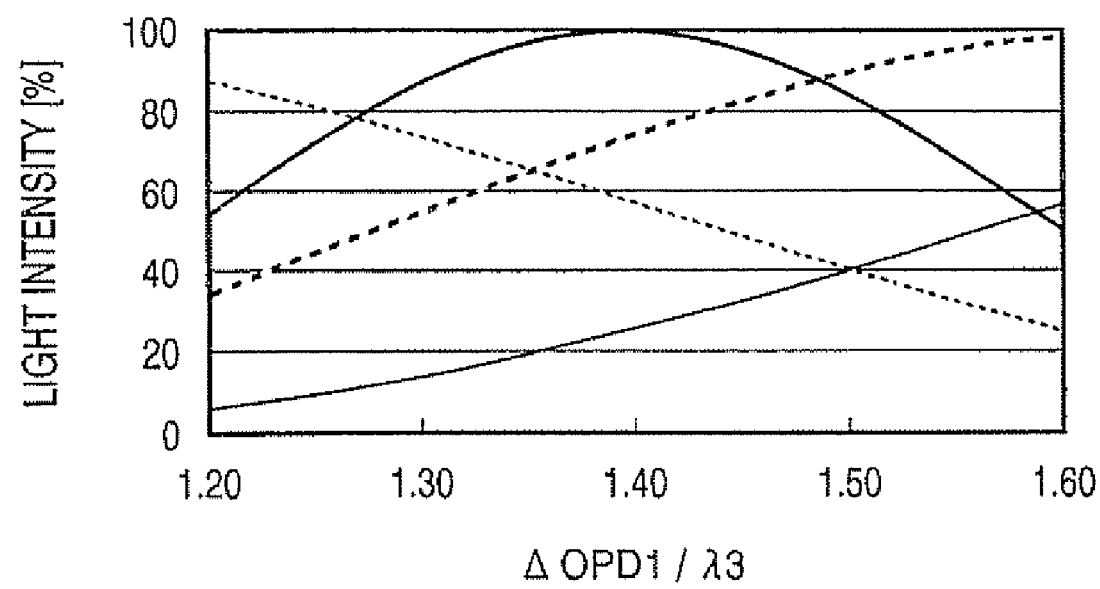
FIG. 6 is a graph showing diffraction efficiency for explaining effects in the case where a condition (24) is satisfied in the second embodiment according to one or more aspects of the present invention.
Figure 7:
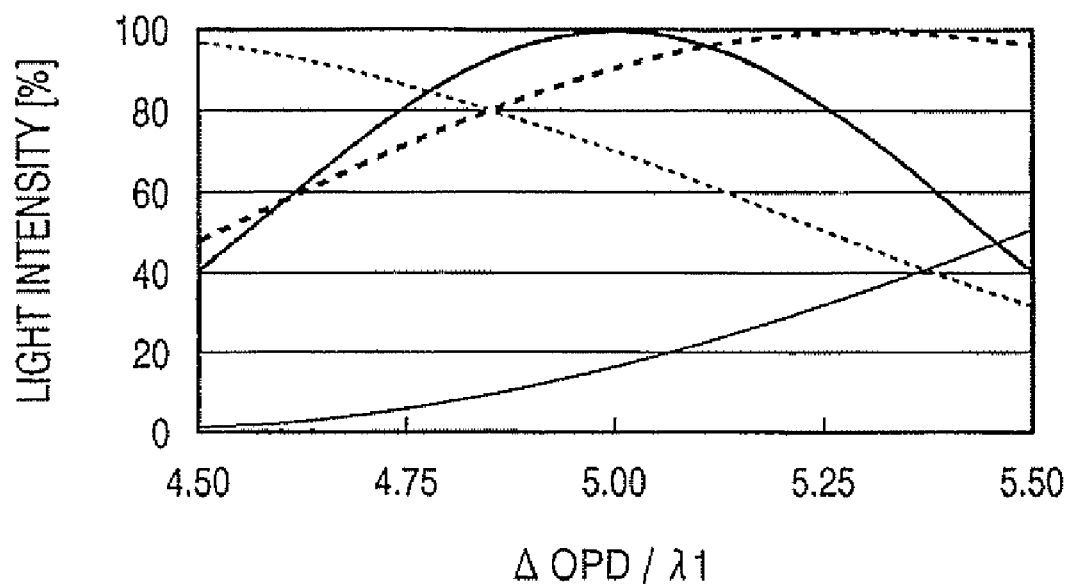
FIG. 7 is a graph showing diffraction efficiency for explaining effects in the case where a condition (25) is satisfied in the second embodiment according to one or more aspects of the present invention.
Figure 8:
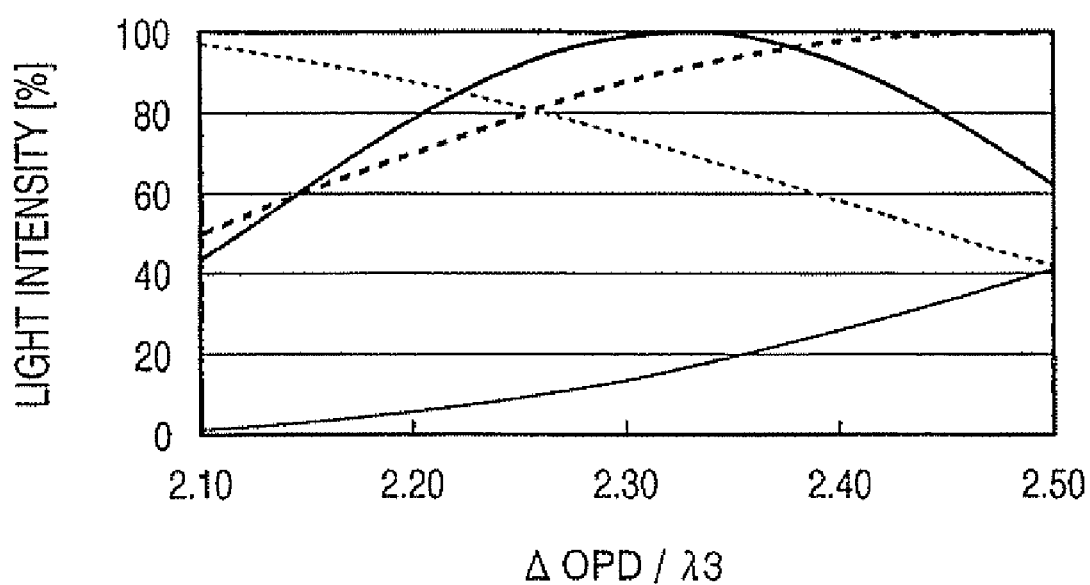
FIG. 8 is a graph showing diffraction efficiency for explaining effects in the case where a condition (26) is satisfied in the second embodiment according to one or more aspects of the present invention.

Next, there will be explained an optical information read/write device in a second embodiment according to one or more aspects of the present invention. Each of FIGS. 4A, 4B, and 4C schematically shows the objective lens 10 and a corresponding one of the optical discs D1, D2, and D3 incorporated in the optical information read/write device in the second embodiment on an individual optical path in use of the corresponding optical disc. In the same manner as FIG. 2, a reference axis AX of the optical information read/write device 100 is indicated by an alternate long and short dash line in each of FIGS. 4A to 4C. It is noted that, in the second embodiment, the same reference characters are given to each of the same constituent elements as the first embodiment, and detailed explanation about them will be omitted.

In the second embodiment, each of the light sources 1A to 1C is arranged at such a position that the laser beam emitted from each of the light sources 1A to 1C is converted into the collimated light by a corresponding one of the coupling lenses 3A to 3C. Thereby, the imaging magnification of the objective lens 10 is caused to be substantially zero. That is, the coupling lenses 3A, 3B, and 3C serve as collimating lenses for collimating the first, second, and third laser beams, respectively.

The phase shift structure in this embodiment has a diffracting function for controlling the spherical aberration caused by wavelength difference among the first to third laser beams to be substantially zero. The diffracting function is regarded as a three wavelength compatibility function to ensure the compatibility among the three wavelengths that causes each of the laser beams transmitted through the objective lens 10 to form a suitable beam spot for the read/write operations with the spherical aberration being reduced on the recording surface 22 of a corresponding optical disc.

For example, the objective lens 10 having the phase shift structure as aforementioned is designed as follows. Initially, at least two kinds of optical path difference functions, for example, a first optical path difference function and a second optical path difference function are calculated that are different from each other in a proportion between diffraction orders at which the first to third laser beams take respective maximum diffraction efficiencies.

It is noted that the optical path difference function expresses a function of the objective lens 10 as a diffraction lens with a form of an additional optical path length at a height of "h" from the optical axis. When the optical path difference function is represented as "ϕ(h)", ϕ(h) can be expressed by the following equation (B):

$$\phi(h) = m\lambda \sum_{i=1} P_{2i} h^{2i} \quad (B)$$

where $P_{2i}$ (where i is an positive integer) is a coefficient of second, fourth, and sixth, . . . orders, m represents a diffraction order at which the laser beam being used takes the maximum diffraction efficiency, and λ represents the design wavelength of the laser beam being used.

Next, the shape of the aforementioned phase shift structure is obtained by combining the calculated optical path difference functions. Thus, the steps included in the phase shift structure determined based upon the two kinds of optical path difference functions cause two kinds of optical path length changes due to which the absolute values of the optical path differences with respect to the first laser beam are different from one another. Namely, the steps of the phase shift structure in the second embodiment are categorized into two kinds of steps, first steps and second steps that give different optical path differences to the first laser beam, respectively. It is noted that the description "the absolute values of the optical path differences are different" intends to clarify that when the optical path difference in a direction from the objective lens 10 to each of the optical discs is defined as a positive optical path difference, and that in the reverse direction is defined as a negative one, merely unconformity of a positive/negative sign between the optical path differences is not regarded as the optical path differences being different.

The first steps of the phase shift structure in the second embodiment are designed such that the optical path difference given to the first laser beam is a predetermined value depending on the Abbe number of the objective lens 10 in the same manner as the first embodiment.

More specifically, when the objective lens 10 with the Abbe number νd satisfying the following condition (1) is employed, the phase shift structure is designed such that the optical path difference ΔOPD1 given to the first laser beam by each of the first steps satisfies the following condition (17).

$$40 \leq \nu d \leq 80 \quad (1),$$

$$2N+1.00 \leq |\Delta OPD1/\lambda 1| < 2N+1.30 \quad (17)$$

Further specifically, the phase shift structure is designed such that the aforementioned first steps that gives the optical path difference to the first laser beam satisfies the following condition (18) or (20).

$$3.04 < |\Delta OPD1/\lambda 1| < 3.29 \quad (18)$$

$$5.07 < |\Delta OPD1/\lambda 1| < 5.25 \quad (20)$$

In addition, in order to allow the intended order diffracted light of the third laser beam to take higher diffraction efficiency than that of unnecessary order diffracted light thereof, the aforementioned steps satisfying the condition (17) are designed to satisfy the following condition (19) or (21). More specifically, the aforementioned steps satisfying the condition (18) are desired to be designed to satisfy the condition (19), while the steps satisfying the condition (20) are desired to be designed to satisfy the condition (21).

$$1.50 < |\Delta OPD1/\lambda 3| < 1.62 \quad (19)$$

$$2.50 < |\Delta OPD1/\lambda 3| < 2.58 \quad (21)$$

The condition (17) corresponds to the condition (2) in the first embodiment. The conditions (18) and (20) correspond to the conditions (3) and (5), respectively. The conditions (19) and (21) correspond to the conditions (4) and (6), respectively. Accordingly, explanation about each of the conditions (17) to (21) will be omitted, as it can be obtained with reference to the explanation about a corresponding one of the conditions (2) to (6).

Further, in the second embodiment, when the objective lens 10 with the Abbe number νd satisfying the following condition (7) is employed, the phase shift structure is designed such that the optical path difference ΔOPD1 satisfies the following condition (22).

$$20 \leq \nu d \leq 40 \quad (7),$$

$$2N+0.70 < |\Delta OPD1/\lambda 1| < 2N+1.25 \quad (22)$$

More specifically, the phase shift structure is designed such that the aforementioned steps that give the optical path difference to the first laser beam satisfy the following condition (23) or (25).

$$2.80 < |\Delta OPD1/\lambda 1| < 3.10 \quad (23)$$

$$4.80 < |\Delta OPD1/\lambda 1| < 5.20 \quad (25)$$

In addition, in order to allow the intended order diffracted light of the third laser beam to take higher diffraction efficiency than that of unnecessary order diffracted light thereof, the aforementioned steps satisfying the condition (22) are designed to satisfy the following condition (24) or (26). More specifically, the aforementioned steps satisfying the condition (23) are desired to be designed to satisfy the condition (24), while the steps satisfying the condition (25) are desired to be designed to satisfy the condition (26).

$$1.30 < |\Delta OPD1/\lambda 3| < 1.47 \quad (24)$$

$$2.27 < |\Delta OPD1/\lambda 3| < 2.46 \quad (26)$$

The condition (22) corresponds to the condition (8) in the first embodiment. The conditions (23) and (25) correspond to the conditions (9) and (11), respectively. The conditions (24) and (26) correspond to the conditions (10) and (12), respectively.

FIGS. 5 to 8 are graphs showing diffraction efficiencies for explaining effects in the case where the respective conditions (23) to (26) are satisfied. In each of the figures, a thick solid line, thick dashed line, thin solid line, and thin dashed line indicate the first laser beam, second laser beam, unnecessary order diffracted light of the third laser beam, and intended order diffracted light of the third laser beam, respectively. In each of the figures, a horizontal axis represents a value of each of the conditions (23) to (26), while a vertical axis represents an intensity (unit: %) of the diffracted light on the recording surface of a corresponding one of the optical discs. The light intensity is indicated as a relative value in the case where the intensity of the third order diffracted light of the first laser beam is defined as 100% in each of FIGS. 5 and 6. Meanwhile, the light intensity is indicated as a relative value in the case where the intensity of the fifth order diffracted light of the first laser beam is defined as 100% in each of FIGS. 7 and 8. A high light intensity means high diffraction efficiency of each of the diffracted light. It is noted that, in FIGS. 5 to 8, the first, second, and third wavelengths are 407 nm, 660 nm, and 790 nm, respectively.

As shown in FIGS. 5 to 8, when the phase shift structure is designed to satisfy each of the conditions, each of the first and second laser beams takes such high diffraction efficiency as to allow the read/write operations to be performed depending on the recording density of each of the optical discs D1 and D2 being used. In addition, when the phase shift structure is designed to satisfy each of the conditions, with respect to the third laser beam, the intended order diffracted light thereof always takes higher diffraction efficiency than that of the unnecessary order diffracted light thereof and a light intensity of 40% or more that is regarded minimum required for the read/write operations on the third optical disc D3 is ensured.

As aforementioned, when the phase shift structure is designed to satisfy each of the conditions (23) to (26), the optical path difference given to the first laser beam by each of the first steps becomes substantially (2K+1) times as long as the wavelength of the first laser beam. Therefore, only the first steps have a limit to ensure a sufficient light intensity of the intended order diffracted light of the third laser beam. Hence, the second steps are designed to heighten the light intensity on the recording surface 22 especially in use of the third optical disc D3. Particularly, the second steps, of the phase shift structure provided on the objective lens 10 in the second embodiment, are designed such that the optical path difference ΔOPD2 given to the first laser beam by each of the second steps satisfies the following condition (27), more specifically, the following condition (28).

$$2N-0.20<|\Delta OPD2/\lambda1|<2N+0.20 \qquad (27)$$

$$1.80<|\Delta OPD2/\lambda1|<2.20 \qquad (28)$$

With the second steps of the phase shift structure being designed such that the optical path difference ΔOPD2 satisfies the condition (27) or (28), it is possible to heighten the light intensity on the recording surface 22 in use of the third optical disc D3, ensuring a high diffraction efficiency of the first laser beam or the second laser beam.

By designing the phase shift structure as aforementioned, when using each of the optical discs D1 to D3, it is possible to sufficiently reduce the spherical aberration generated in use of each of the optical discs D1 to D3, and the coma aberration and/or astigmatism caused by the tracking operation, even though a corresponding one of the first to third laser beams is converted to substantially collimated light. In addition, it is possible to prevent the unnecessary order diffracted light from being generated in use of the third optical disc D3, so as to keep the focusing function favorable.

Hereinabove, the two embodiments have been explained. In each of the embodiments, the phase shift structure having the aforementioned steps is not necessarily required to be provided on the entire area of the first surface 11. The aforementioned phase shift structure my be provided in an area that is the most inside area of the first surface 11 including the optical axis of the objective lens 10, and contributes to converging the third laser beam, i.e., an area that contributes to converging any of the first to third laser beams (hereinafter, referred to as "a first area").

In addition, in the objective lenses 10 in the first and second embodiments, depending on an effective beam diameter to ensure the NA necessary for the read/write operations on each of the optical discs D1 to D3, there may sometimes be provided a second area having a phase shift structure different from that of the first area outside the first area, and furthermore, a third area having a phase shift structure different from those of the first and second areas outside the second area.

The phase shift structure in the second area has a diffracting function to sufficiently converge each of the first and second laser beam employed in use of each of the first and second optical discs D1 and D2 on which higher NAs are generally required than the NA on the third optical disc D3.

The phase shift structure in the second area has such steps as not to contribute to converging the third laser beam. Namely, on the basis of the first laser beam (in other words, when the first laser beam is incident), an absolute value of at least one kind of optical path difference among the optical path differences caused by the steps in the second area is different from an absolute value of the optical path difference caused by the steps in the first area. Here, when two or more kinds of steps exist in the first area, steps that give the first laser beam the optical path difference of which ratio to the wavelength of the first laser beam is close to an even number corresponds to the aforementioned steps in the first area. For example, when there are two kinds of steps as aforementioned in the first area, the steps configured to satisfy the aforementioned condition (27) or (28) corresponds to the aforementioned steps in the first area.

Further, the phase shift structure in the third area is provided in the case where an incident beam diameter of the first laser beam on the first surface 11 of the objective lens 10 is different from the effective beam diameter of the second laser beam.

There is cited as a case where the third area is provided, firstly, a case where the following condition (29) is satisfied:

$$f1 \times NA1 > f2 \times NA2 \qquad (29)$$

where f1 represents a focal length in use of the first optical disc D1, and f2 is a focal length in use of the second optical disc D2. In other words, the aforementioned cited case is a case where the effective beam diameter on the incident surface of the objective lens 10 on which the first laser beam is incident is larger than the effective beam diameter on the incident surface of the objective lens 10 on which the second laser beam is incident. In this case, there is formed on the first surface 11 the third area that has such a phase shift structure that the first laser beam sufficiently converges on the recording surface of the first optical disc D1 substantially without any aberration.

The third area formed in the case of the condition (29) being satisfied, in contrast to the second area, does not contribute to converging the second laser beam. That is, the phase shift structure in the third area formed in the case of the condition (29) being satisfied is provided with an aperture regulating function for the second laser beam. Therefore, the phase shift structure is designed such that the optical path difference given to the first laser beam by the step at the boundary between each couple of adjacent refractive surface zones is different from the optical path difference given to the first laser beam in the second area. In such design, the third area is blazed to attain the maximum diffraction efficiency for the first laser beam.

There is cited as a case where the third area is provided, secondly, a case where the following condition (30) is satisfied.

$$f1 \times NA1 < f2 \times NA2 \qquad (30)$$

In other words, the aforementioned cited case is a case where the effective beam diameter on the incident surface of the objective lens 10 on which the second laser beam is incident is larger than the effective beam diameter on the incident surface of the objective lens 10 on which the first laser beam is incident. In this case, there is formed on the first surface 11 the third area that has such a phase shift structure that the second laser beam sufficiently converges on the recording surface of the second optical disc D2 substantially without any aberration. The third area formed in the case of the condition (30) being satisfied, in contrast to the second area, does not contribute to converging the first laser beam. That is, the phase shift structure in the third area formed in the case of the condition (30) being satisfied is provided with an aperture regulating function for the first laser beam. Therefore, the phase shift structure is designed such that the optical path difference given to the second laser beam by the step at the boundary between each couple of adjacent refractive surface zones is different from the optical path difference given to the second laser beam in the second area. In such design, the third area is blazed to attain the maximum diffraction efficiency for the second laser beam.

There are shown five concrete practical examples (practical examples 1 to 5) of the optical information read/write device 100 that uses the objective lens 10 designed with the design method in the aforementioned first embodiment as an objective optical system, and two concrete practical examples (practical examples 6 and 7) of the objective lens 10. The optical information read/write device 100 in each of the practical examples 1 and 2 is shown in FIGS. 1, and 2A to 2C. Further, the optical information read/write device 100 in each of the practical examples 3 to 5 is shown in FIGS. 1, and 4A to 4C. It is noted that, in each of the practical examples, an aperture regulating device (not shown) for regulating the beam diameter is used to obtain a favorable numerical aperture in the read/write operations in use of the third optical disc D3. For this reason, as shown in FIGS. 2A to 2C, and 4A to 4C, the effective beam diameter in use of the third optical disc D3 is smaller than those in use of the first and second optical discs D1 and D2.

There are assumed as the optical discs employed in each of the practical examples the first optical disc D1 of the highest recording density with a protective layer thickness of 0.6 mm, the second optical disc D2 of the second highest recording density with a protective layer thickness of 0.6 mm, and the third optical disc D3 of the lowest recording density with a protective layer thickness of 1.2 mm.

Practical Example 1

The objective lens 10 incorporated in the optical information read/write device 100 in the practical example 1 is provided with the phase shift ring-shaped zone structure composed of only the steps that give one kind of optical path difference on the first surface 11. Concrete specifications of the objective lens 10 in the practical example 1 is shown in Table 1.

TABLE 1

|  | 1st Laser | 2nd Laser | 3rd Laser |
|---|---|---|---|
| Wavelength [nm] | 405 | 660 | 790 |
| Focal Length [mm] | 3.000 | 3.103 | 3.122 |
| NA | 0.650 | 0.628 | 0.469 |
| Magnification M | 0.000 | 0.000 | −0.026 |

As shown by the magnifications in Table 1, in the practical example 1, the laser beam is incident on the objective lens 10 as the collimated light in use of any of the optical discs D1 and D2, and as the diverging light in use of the optical disc D3. There are shown in Tables 2, 3, and 4 concrete specifications of the optical information read/write device 100 including the objective lens 10 with the specifications shown in Table 1 in use of the optical discs D1, D2, and D3, respectively.

TABLE 2

| Surface No. | r [mm] | d [mm] | n (405 nm) | Remarks |
|---|---|---|---|---|
| 0 |  | 2.81 |  | Light Source 1A |
| 1 | ∞ | 2.00 | 1.52972 | Diffraction Grating 2A |
| 2 | ∞ | 13.00 |  |  |
| 3 | 85.710 | 1.50 | 1.52469 | Coupling Lens 3A |
| 4 | −10.550 | 1.00 |  |  |
| 5 | ∞ | 4.00 | 1.52972 | Beam Splitter 41 |
| 6 | ∞ | 1.00 |  |  |
| 7 | ∞ | 4.00 | 1.52972 | Beam Splitter 42 |
| 8 | ∞ | 3.09 |  |  |
| 9 | 1.855 | 1.90 | 1.52469 | Objective Lens 10 |
| 10 | −6.730 | 1.57 |  |  |
| 11 | ∞ | 0.60 | 1.62231 | Optical Disk D1 |
| 12 | ∞ | — |  |  |

TABLE 3

| Surface No. | r [mm] | d [mm] | n (660 nm) | Remarks |
|---|---|---|---|---|
| 0 |  | 2.79 |  | Light Source 1B |
| 1 | ∞ | 2.00 | 1.51374 | Diffraction Grating 2B |
| 2 | ∞ | 13.00 |  |  |
| 3 | 101.820 | 1.50 | 1.54044 | Coupling Lens 3B |
| 4 | −10.700 | 1.00 |  |  |
| 5 | ∞ | 4.00 | 1.51374 | Beam Splitter 41 |
| 6 | ∞ | 1.00 |  |  |
| 7 | ∞ | 4.00 | 1.51374 | Beam Splitter 42 |
| 8 | ∞ | 3.00 |  |  |
| 9 | 1.855 | 1.90 | 1.50635 | Objective Lens 10 |
| 10 | −6.730 | 1.66 |  |  |
| 11 | ∞ | 0.60 | 1.57961 | Optical Disk D2 |
| 12 | ∞ | — |  |  |

TABLE 4

| Surface No. | r [mm] | d [mm] | n (709 nm) | Remarks |
|---|---|---|---|---|
| 0 |  | 2.98 |  | Light Source 1C |
| 1 | ∞ | 2.00 | 1.51052 | Diffraction Grating 2C |
| 2 | ∞ | 15.00 |  |  |
| 3 | −129.100 | 1.50 | 1.53653 | Coupling Lens 3C |
| 4 | −12.200 | 4.97 |  |  |
| 5 | ∞ | 4.00 | 1.51052 | Beam Splitter 42 |
| 6 | ∞ | 3.28 |  |  |
| 7 | 1.855 | 1.90 | 1.50313 | Objective Lens 10 |
| 8 | −6.730 | 1.37 |  |  |
| 9 | ∞ | 1.20 | 1.57307 | Optical Disk D3 |
| 10 | ∞ | — |  |  |

As shown in "Remarks" of each of Tables 2 to 4, surface No. 0 represents each of the light sources 1A to 1C. Surface No. 1 and No. 2 represent each of the diffraction gratings 2A to 2C. Surface No. 3 and No. 4 represent each of the coupling lenses 3A to 3C. Surface No. 5 and No. 6 in Tables 2 and 3 represent the beam splitter 41. Surface No. 7 and No. 8 in Tables 2 and 3 and surface No. 5 and No. 6 in Table 4 represent the beam splitter 42. Surface No. 9 and No. 10 in Tables 2 and 3 and surface No. 7 and No. 8 in Table 4 represent the objective lens 10. Surface No. 11 and No. 12 in Tables 2 and 3 represent the protective layer 21 and the recording surface 22 of each of the optical discs D1 and D2, respectively. In the same way, surface No. 9 and No. 10 in Table 4 represent the protective layer 21 and the recording surface 22 of the optical disc D3. In Tables 2 to 4, "r" represents a curvature radius of each lens surface "d" represents a lens thickness or distance from a lens surface to a next lens surface in the read/write operations, and n (X nm) represents a refractive index at a wavelength of X nm. The same applies to each of tables showing concrete specifications in each of the below-mentioned practical examples.

In addition, the second surface of each of the coupling lenses 3A to 3C, and both surfaces 11 and 12 of the objective lens 10 are aspheric. There are shown in Tables 5, 6, and 7 the conical coefficients and the aspheric coefficients for regulating the shape of each of the aspheric surfaces in the read/write operations on the first, second, and third optical discs D1, D2, and D3, respectively. It is noted that a notation symbol E in each of the tables represents that 10 is used as a radix and a right side value of E is used as an exponent.

ring-shaped zones. The range of each of the ring-shaped zones is expressed with a pair of heights from the optical axis, hmin and hmax.

TABLE 10

| No. | hmin | hmax | $|\Delta OPD/\lambda 1|$ | $|\Delta OPD/\lambda 3|$ |
|---|---|---|---|---|
| 0 | 0.000 | 0.920 | | |
| 1 | 0.920 | 1.199 | 3.17 | 1.56 |
| 2 | 1.199 | 1.351 | 3.17 | 1.56 |
| 3 | 1.351 | 1.457 | 3.17 | 1.56 |

TABLE 5

| Surface No. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 | −0.6000 | 2.0680E−04 | 1.0190E−04 | −6.9930E−05 | −1.9020E−05 | 2.1544E−07 |
| 10 | 0.0000 | 2.1840E−02 | −6.8750E−03 | 1.5850E−03 | −2.1790E−04 | 1.3353E−05 |

TABLE 6

| Surface No. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 | −0.6000 | 2.0680E−04 | 1.0190E−04 | −6.9930E−05 | −1.9020E−05 | 2.1544E−07 |
| 10 | 0.0000 | 2.1840E−02 | −6.8750E−03 | 1.5850E−03 | −2.1790E−04 | 1.3353E−05 |

TABLE 7

| Surface No. | K | A4 | A6 | A8 | A10 | A12 |
|---|---|---|---|---|---|---|
| 4 | 0.0000 | 2.5840E−05 | 1.5040E−07 | 0.0000E+00 | 0.0000E+00 | 0.0000E+00 |
| 7 | −0.6000 | 2.0680E−04 | 1.0190E−04 | −6.9930E−05 | −1.9020E−05 | 2.1544E−07 |
| 8 | 0.0000 | 2.1840E−02 | −6.8750E−03 | 1.5850E−03 | −2.1790E−04 | 1.3353E−05 |

There are shown in Table 8 coefficients $P_{2i}$ in the optical path difference function for regulating the phase shift ring-shaped zone structure that is formed on the first surface 11 of the objective lens 10 in the practical example 1. In addition, there are shown in Table 9 the diffraction orders m at which each of the laser beams takes the maximum diffraction efficiency. As shown in Table 9, each of the respective diffraction orders m is set depending on a laser beam being used.

TABLE 10-continued

| No. | hmin | hmax | $|\Delta OPD/\lambda 1|$ | $|\Delta OPD/\lambda 3|$ |
|---|---|---|---|---|
| 4 | 1.457 | 1.540 | 3.17 | 1.56 |
| 5 | 1.540 | 1.608 | 3.17 | 1.56 |

TABLE 8

| 1st Surface 11 | P2 | P4 | P6 | P8 | P10 | P12 |
|---|---|---|---|---|---|---|
| | 0.0000E+00 | −6.9400E−01 | 1.4870E−02 | −2.5120E−02 | 0.0000E+00 | 0.0000E+00 |

TABLE 9

| | 1st Laser | 2nd Laser | 3rd Laser |
|---|---|---|---|
| Diffraction Order m | 3 | 2 | 2 |

There are shown in Table 10 concrete specifications of the phase shift ring-shaped zone structure formed on the first surface 11 of the objective lens 10 in the practical example 1. Table 10 shows a range of each of the ring-shaped zones formed on the first surface 11 of the objective lens 10 in the practical example 1, and the optical path difference caused by the first laser beam being transmitted through each of the TABLE 10-continued

| No. | hmin | hmax | $|\Delta OPD/\lambda 1|$ | $|\Delta OPD/\lambda 3|$ |
|---|---|---|---|---|
| 6 | 1.608 | 1.665 | 3.17 | 1.56 |
| 7 | 1.665 | 1.715 | 3.17 | 1.56 |
| 8 | 1.715 | 1.759 | 3.17 | 1.56 |
| 9 | 1.759 | 1.798 | 3.17 | 1.56 |
| 10 | 1.798 | 1.834 | 3.17 | 1.56 |
| 11 | 1.834 | 1.867 | 3.17 | 1.56 |
| 12 | 1.867 | 1.897 | 3.17 | 1.56 |
| 13 | 1.897 | 1.925 | 3.17 | 1.56 |
| 14 | 1.925 | 1.950 | 3.17 | 1.56 |

The objective lens 10 of the optical information read/write device 100 in the practical example 1 satisfies the condition (1), as the Abbe number vd is equal to 58. In addition, as shown in Table 10, the optical path difference |ΔOPD/λ1| given to the first laser beam by the step between each couple of adjacent ring-shaped zones is 3.17 (i.e., N=1), and therefore satisfies the conditions (2) and (3). Further, the optical path difference |ΔOPD/λ3| given to the third laser beam by the step between each couple of adjacent ring-shaped zones is 1.56, and satisfies the condition (4).

Here, in the optical information read/write device 100 in the practical example 1, there are shown in Table 11 concrete specifications of the optical system for detecting a focus error signal in the read/write operations on the third optical disc D3.

TABLE 11

| Surface No. | r [mm] | d [mm] | n (660 nm) | Remarks |
|---|---|---|---|---|
| 11 | ∞ | 1.20 | 1.57307 | Optical Disk D3 |
| 12 | ∞ | 1.37 | | |
| 13 | 6.730 | 1.90 | 1.50313 | Objective Lens 10 |
| 14 | −1.855 | 3.28 | | |
| 15 | ∞ | 4.00 | 1.51052 | Beam Splitter 42 |
| 16 | ∞ | 4.97 | | |
| 17 | 12.200 | 1.50 | 1.53653 | Coupling Lens 3C |
| 18 | 129.100 | 9.00 | | |
| 19 | ∞ | 2.20 | 1.51052 | Half Mirror 5C |
| 20 | ∞ | 9.78 | | |
| 21 | ∞ | — | | Light Receiving Portion 6C |

As shown in "Remarks" in Table 11, surface No. 11 and No. 12 represent the protective layer and the recording surface of the optical disc D3, respectively, surface No. 13 and No. 14 represent the objective lens 10, surface No. 15 and No. 16 represent the beam splitter 42, surface No. 17 and No. 18 represent the coupling lens 3C, surface No. 19 and No. 20 represent the half mirror 5C, and surface No. 21 represents the light receiving portion 6C. The same applies to a table that indicates concrete specifications of an optical system for detecting the focus error signal shown in each of the practical examples below.

FIG. 9 shows a focus error signal detected by the light receiving portion 6C in the read/write operations on the third optical disc D3 in the optical information read/write device 100 in the practical example 1. In FIG. 9, the vertical axis shows a level of the detected focus error signal, while the horizontal axis shows a defocus amount of the objective lens 10. The same applies to a figure showing a focus error signal shown in each of the practical examples below. As shown in FIG. 9, the focus error signal detected by the light receiving portion 6C has a favorable waveform with small deformation. Namely, the optical information read/write device 100 in the practical example 1 suppresses the deformation of the focus error signal and prevents the focusing function from being deteriorated with the conditions (3) or (4) being satisfied.

Further, the optical information read/write device 100 in the practical example 1, as understood from Table 1, satisfies the conditions (13), (14), and (15), since "f1×M1" is 0.000, "f2×M2" is 0.000, and "f3×M3" is −0.0082.

FIGS. 10A, 10B, and 10C show spherical aberrations generated in use of the first, second, and third laser beams in the optical information read/write device 100 in the practical example 1, respectively. The same applies to a graph showing aberration shown in each of the practical examples below.

As shown in FIGS. 10A, 10B, and 10C, the optical information read/write device 100 with the objective lens 10 incorporated therein in the practical example 1 can sufficiently compensate the spherical aberration even in the read/write operations on any of the optical discs D1 to D3, so as to form a suitable beam spot on the recording surface for the read/write operations. Hereinabove, the optical information read/write device 100 in the practical example 1 has been described.

Practical Example 2

Concrete specifications of the objective lens 10 in the practical example 2 are the same as those in the practical example 1. Accordingly, explanation about them will be omitted, as detailed information on them can be obtained with reference to the aforementioned Tables 1 to 9.

There are shown in Table 12 concrete specifications of the phase shift ring-shaped zone structure formed on the first surface 11 of the objective lens 10 in the practical example 2. Table 12 shows a range of each of the ring-shaped zones formed on the first surface 11 of the objective lens 10, and the optical path difference caused by the first laser beam being transmitted through each of the ring-shaped zones.

TABLE 12

| No. | hmin | hmax | |ΔOPD/λ1| | |ΔOPD/λ3| |
|---|---|---|---|---|
| 0 | 0.000 | 0.920 | | |
| 1 | 0.920 | 1.199 | 3.08 | 1.52 |
| 2 | 1.199 | 1.351 | 3.08 | 1.52 |
| 3 | 1.351 | 1.457 | 3.08 | 1.52 |
| 4 | 1.457 | 1.540 | 3.08 | 1.52 |
| 5 | 1.540 | 1.608 | 3.08 | 1.52 |
| 6 | 1.608 | 1.665 | 3.08 | 1.52 |
| 7 | 1.665 | 1.715 | 3.08 | 1.52 |
| 8 | 1.715 | 1.759 | 3.08 | 1.52 |
| 9 | 1.759 | 1.798 | 3.08 | 1.52 |
| 10 | 1.798 | 1.834 | 3.08 | 1.52 |
| 11 | 1.834 | 1.867 | 3.08 | 1.52 |
| 12 | 1.867 | 1.897 | 3.08 | 1.52 |
| 13 | 1.897 | 1.925 | 3.08 | 1.52 |
| 14 | 1.925 | 1.950 | 3.08 | 1.52 |

The objective lens 10 of the optical information read/write device in the practical example 2 satisfies the condition (1) as the Abbe number vd is equal to 58. In addition, as shown in Table 12, the optical path difference |ΔOPD/λ1| given to the first laser beam by the step between each couple of adjacent ring-shaped zones is 3.08 (i.e., N=1), and therefore satisfies the conditions (2) and (3). Further, the optical path difference |ΔOPD/λ3| given to the third laser beam by the step between each couple of adjacent ring-shaped zones is 1.52, and therefore satisfies the condition (4).

FIG. 11 shows a focus error signal detected by the light receiving portion 6C in the read/write operations on the third optical disc D3 in the optical information read/write device 100 with the objective lens 10 incorporated therein in the practical example 2. Here, since the optical system for detecting a focus error is the same as that in the practical example 1, explanation about them will be omitted. As shown in FIG. 11, the focus error signal detected by the light receiving portion 6C has a favorable waveform with small deformation. Namely, the optical information read/write device 100 in the practical example 2 reduces the deformation of the focus error signal and prevents the focusing function from being deteriorated with the condition (3) or (4) being satisfied in the same way as the practical example 1. Hereinabove, the optical information read/write device 100 in the practical example 2 has been described.

Practical Example 3

The objective lens 10 of the optical information read/write device 100 in the practical example 3 has two kinds of steps that give different optical path differences to the first laser beam, respectively. There are shown in Table 13 concrete specifications of the objective lens 10 in the practical example 3.

TABLE 13

|  | 1st Laser | 2nd Laser | 3rd Laser |
|---|---|---|---|
| Wavelength [nm] | 405 | 660 | 790 |
| Focal Length [mm] | 3.000 | 3.103 | 3.122 |
| NA | 0.650 | 0.625 | 0.471 |
| Magnification M | 0.000 | 0.000 | 0.000 |

As shown by the magnifications in Table 13, in the practical example 3, the laser beam is incident on the objective lens 10 as the collimated light in use of any of the optical discs D1, D2 and D3. There are shown in Tables 14, 15, and 16 concrete specifications of the optical information read/write device 100 including the objective lens 10 configured with the specifications shown in Table 13 in use of the optical discs D1, D2, and D3, respectively.

TABLE 14

| Surface No. | r [mm] | d [mm] | n (405 nm) | Remarks |
|---|---|---|---|---|
| 0 |  | 2.81 |  | Light Source 1A |
| 1 | ∞ | 2.00 | 1.52972 | Diffraction Grating 2A |
| 2 | ∞ | 13.00 |  |  |
| 3 | 85.710 | 1.50 | 1.52469 | Coupling Lens 3A |
| 4 | −10.550 | 1.00 |  |  |
| 5 | ∞ | 4.00 | 1.52972 | Beam Splitter 41 |
| 6 | ∞ | 1.00 |  |  |
| 7 | ∞ | 4.00 | 1.52972 | Beam Splitter 42 |
| 8 | ∞ | 3.09 |  |  |
| 9 | 1.855 | 1.90 | 1.52469 | Objective Lens 10 |
| 10 | −6.730 | 1.57 |  |  |

TABLE 14-continued

| Surface No. | r [mm] | d [mm] | n (405 nm) | Remarks |
|---|---|---|---|---|
| 11 | ∞ | 0.60 | 1.62231 | Optical Disk D1 |
| 12 | ∞ | — |  |  |

TABLE 15

| Surface No. | r [mm] | d [mm] | n (660 nm) | Remarks |
|---|---|---|---|---|
| 0 |  | 2.79 |  | Light Source 1B |
| 1 | ∞ | 2.00 | 1.51374 | Diffraction Grating 2B |
| 2 | ∞ | 13.00 |  |  |
| 3 | 101.820 | 1.50 | 1.54044 | Coupling Lens 3B |
| 4 | −10.700 | 1.00 |  |  |
| 5 | ∞ | 4.00 | 1.51374 | Beam Splitter 41 |
| 6 | ∞ | 1.00 |  |  |
| 7 | ∞ | 4.00 | 1.51374 | Beam Splitter 42 |
| 8 | ∞ | 3.00 |  |  |
| 9 | 1.855 | 1.90 | 1.50635 | Objective Lens 10 |
| 10 | −6.730 | 1.66 |  |  |
| 11 | ∞ | 0.60 | 1.57961 | Optical Disk D2 |
| 12 | ∞ | — |  |  |

TABLE 16

| Surface No. | r [mm] | d [mm] | n (790 nm) | Remarks |
|---|---|---|---|---|
| 0 |  | 2.79 |  | Light Source 1C |
| 1 | ∞ | 2.00 | 1.51052 | Diffraction Grating 2C |
| 2 | ∞ | 13.00 |  |  |
| 3 | 96.346 | 1.50 | 1.53653 | Coupling Lens 3C |
| 4 | −10.675 | 5.00 |  |  |
| 5 | ∞ | 4.00 | 1.51052 | Beam Splitter 42 |
| 6 | ∞ | 3.37 |  |  |
| 7 | 1.855 | 1.90 | 1.50313 | Objective Lens 10 |
| 8 | −6.730 | 1.29 |  |  |
| 9 | ∞ | 1.20 | 1.57307 | Optical Disk D3 |
| 10 | ∞ | — |  |  |

In addition, the second surface of each of the coupling lenses 3A to 3C, and both surfaces 11 and 12 of the objective lens 10 are aspheric. There are shown in Tables 17, 18, and 19 the conical coefficients and the aspheric coefficients for regulating the shape of each of the aspheric surfaces in the read/write operations on the first, second, and third optical discs D1, D2, and D3, respectively.

TABLE 17

| Surface No. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 | −0.6000 | 8.0850E−04 | 2.5590E−04 | −1.0570E−05 | 2.5470E−05 | −8.6480E−07 |
| 10 | 0.0000 | 1.3680E−02 | −5.7930E−03 | 1.6930E−03 | −2.9390E−04 | 2.2500E−05 |

TABLE 18

| Surface No. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 | −0.6000 | 8.0850E−04 | 2.5590E−04 | −1.0570E−04 | 2.5470E−08 | −8.6480E−07 |
| 10 | 0.0000 | 1.3680E−02 | −5.7930E−03 | 1.6930E−03 | −2.9390E−04 | 2.2500E−05 |

TABLE 19

| Surface No. | K | A4 | A6 | A8 | A10 | A12 |
|---|---|---|---|---|---|---|
| 4 | 0.0000 | −7.5630E−06 | −9.3160E−08 | 0.0000E+00 | 0.0000E+00 | 0.0000E+00 |
| 7 | −0.6000 | 8.0850E−04 | 2.5590E−04 | −1.0570E−04 | 2.5470E−08 | −8.6480E−07 |
| 8 | 0.0000 | 1.3680E−02 | −5.7930E−03 | 1.6930E−03 | −2.9390E−04 | 2.2500E−05 |

As aforementioned, the objective lens 10 in the practical example 3 is provided with the phase shift ring-shaped zone structure configured with two kinds of steps that give the different optical path difference, respectively. The phase shift structure is defined by two kinds of optical path difference functions, i.e., the first and second optical path difference functions. There are shown in Table 20 coefficients $P_{2i}$ in each of the optical path difference functions. In addition, there are shown in Table 21 the diffraction orders m at which each of the laser beams takes the maximum diffraction efficiency. As shown in Table 21, a diffraction order m is set for each of the optical path difference functions depending on a laser beam being used.

TABLE 20

| | 1st Surface 11 | | | | | |
|---|---|---|---|---|---|---|
| | P2 | P4 | P6 | P8 | P10 | P12 |
| 1st OPDF | 0.0000E+00 | −9.2120E−01 | 1.0480E−01 | −3.7890E−02 | 0.0000E+00 | 0.0000E+00 |
| 2nd OPDF | 0.0000E+00 | −3.6030E−01 | −7.7280E−02 | 1.0670E−02 | 0.0000E+00 | 0.0000E+00 |

TABLE 21

| Diffraction Order m | 1st Laser | 2nd Laser | 3rd Laser |
|---|---|---|---|
| 1st OPDF | 3 | 2 | 2 |
| 1st OPDF | 2 | 1 | 1 |

There are shown in Table 22 concrete specifications of the phase shift ring-shaped zone structure formed on the first surface 11 of the objective lens 10 in the practical example 3. Table 22 shows a range of each of the ring-shaped zones formed on the first surface 11 of the objective lens 10 in the practical example 3, and the optical path difference caused by the first laser beam being transmitted through each of the ring-shaped zones. The range of each of the ring-shaped zones is expressed with a pair of heights from the optical axis, hmin and hmax.

TABLE 22

| No. | hmin | hmax | |ΔOPD1/λ1| | |ΔOPD2/λ1| | |ΔOPD1/λ3| |
|---|---|---|---|---|---|
| 0 | 0.000 | 0.834 | | | |
| 1 | 0.834 | 1.038 | 3.21 | 0.00 | 1.58 |
| 2 | 1.038 | 1.086 | 0.00 | 1.94 | 0.00 |
| 3 | 1.086 | 1.224 | 3.21 | 0.00 | 1.58 |
| 4 | 1.224 | 1.323 | 3.21 | 0.00 | 1.58 |
| 5 | 1.323 | 1.340 | 3.21 | 0.00 | 1.58 |
| 6 | 1.340 | 1.402 | 0.00 | 1.94 | 0.00 |
| 7 | 1.402 | 1.467 | 3.21 | 0.00 | 1.58 |
| 8 | 1.467 | 1.510 | 3.21 | 0.00 | 1.58 |
| 9 | 1.510 | 1.523 | 0.00 | 1.94 | 0.00 |
| 10 | 1.523 | 1.572 | 3.21 | 0.00 | 1.58 |
| 11 | 1.572 | 1.616 | 3.21 | 0.00 | 1.58 |
| 12 | 1.616 | 1.634 | 3.21 | 0.00 | 1.58 |
| 13 | 1.634 | 1.656 | 0.00 | 1.94 | 0.00 |

TABLE 22-continued

| No. | hmin | hmax | |ΔOPD1/λ1| | |ΔOPD2/λ1| | |ΔOPD1/λ3| |
|---|---|---|---|---|---|
| 14 | 1.656 | 1.692 | 3.21 | 0.00 | 1.58 |
| 15 | 1.692 | 1.726 | 3.21 | 0.00 | 1.58 |
| 16 | 1.726 | 1.735 | 3.21 | 0.00 | 1.58 |
| 17 | 1.735 | 1.757 | 0.00 | 1.94 | 0.00 |
| 18 | 1.757 | 1.786 | 3.21 | 0.00 | 1.58 |
| 19 | 1.786 | 1.814 | 3.21 | 0.00 | 1.58 |
| 20 | 1.814 | 1.822 | 3.21 | 0.00 | 1.58 |
| 21 | 1.822 | 1.839 | 0.00 | 1.94 | 0.00 |
| 22 | 1.839 | 1.864 | 3.21 | 0.00 | 1.58 |

TABLE 22-continued

| No. | hmin | hmax | |ΔOPD1/λ1| | |ΔOPD2/λ1| | |ΔOPD1/λ3| |
|---|---|---|---|---|---|
| 23 | 1.864 | 1.887 | 3.21 | 0.00 | 1.58 |
| 24 | 1.887 | 1.899 | 3.21 | 0.00 | 1.58 |
| 25 | 1.899 | 1.909 | 0.00 | 1.94 | 0.00 |
| 26 | 1.909 | 1.930 | 3.21 | 0.00 | 1.58 |
| 27 | 1.930 | 1.950 | 3.21 | 0.00 | 1.58 |

The objective lens 10 of the optical information read/write device 100 in the practical example 3 satisfies the condition (1), as the Abbe number νd is equal to 58. In addition, as shown in Table 22, the optical path difference |ΔOPD1/λ1| given to the first laser beam by each of the first steps is 3.21 (i.e., N=1), and therefore satisfies the conditions (17) and (18). In the optical path difference |ΔOPD1/λ3| given to the third laser beam by each of the first steps is 1.58, and therefore satisfies the condition (19) as well.

Further the optical path difference |ΔOPD2/λ1| given to the first laser beam by each of the second steps is 1.94 (i.e., N=1), and therefore satisfies the conditions (27) and (28).

Here, in the optical information read/write device 100 in the practical example 3, there are shown in Table 23 concrete specifications of the optical system for detecting a focus error signal in the read/write operations on the third optical disc D3.

TABLE 23

| Surface No. | r [mm] | d [mm] | n (790 nm) | Remarks |
|---|---|---|---|---|
| 11 | ∞ | 1.20 | 1.57307 | Optical Disk D3 |
| 12 | ∞ | 1.29 | | |

TABLE 23-continued

| Surface No. | r [mm] | d [mm] | n (790 nm) | Remarks |
|---|---|---|---|---|
| 13 | 6.730 | 1.90 | 1.50313 | Objective Lens 10 |
| 14 | −1.855 | 3.37 | | |
| 15 | ∞ | 4.00 | 1.51052 | Beam Splitter 42 |
| 16 | ∞ | 5.00 | | |
| 17 | 10.675 | 1.50 | 1.53653 | Coupling Lens 3C |
| 18 | −96.346 | 9.00 | | |
| 19 | ∞ | 2.20 | 1.51052 | Half Mirror 5C |
| 20 | ∞ | 7.58 | | |
| 21 | ∞ | — | | Light Receiving Portion 6C |

FIG. 12 shows a focus error signal detected by the light receiving portion 6C in the read/write operations on the third optical disc D3 in the optical information read/write device 100 in the practical example 3. As shown in FIG. 12, the focus error signal detected by the light receiving portion 6C has a favorable waveform with small deformation. Namely, the optical information read/write device 100 in the practical example 3 improves the diffraction efficiency in use of any of the optical discs with each of the aforementioned conditions being satisfied. In addition, the optical information read/write device 100 in the practical example 3 suppresses the deformation of the focus error signal and prevents the focusing function from being deteriorated especially in use of the third optical disc D3.

FIGS. 13A, 13B, and 13C show spherical aberrations generated in use of the first, second, and third laser beams in the optical information read/write device 100 in the practical example 3, respectively.

As shown in FIGS. 13A, 13B, and 13C, the optical information read/write device 100 with the objective lens 10 incorporated therein in the practical example 3 can sufficiently compensate the spherical aberration even in the read/write operations on any of the optical discs D1 to D3, so as to form a suitable beam spot on the recording surface for the read/write operations. Hereinabove, the optical information read/write device 100 in the practical example 3 has been described.

Practical Example 4

The objective lens 10 of the optical information read/write device 100 in the practical example 4 has the phase shift ring-shaped zone structure configured with two kinds of steps on the first surface 11 that give different optical path differences to the first laser beam, respectively, in the same way as the practical example 3. There are shown in Table 24 concrete specifications of the objective lens 10 in the practical example 4.

TABLE 24

| | 1st Laser | 2nd Laser | 3rd Laser |
|---|---|---|---|
| Wavelength [nm] | 405 | 660 | 790 |
| Focal Length [mm] | 3.000 | 3.103 | 3.122 |
| NA | 0.650 | 0.628 | 0.471 |
| Magnification M | 0.000 | 0.000 | 0.000 |

As shown by the magnifications in Table 24, in the practical example 4 as well as the practical example 3, the laser beam is incident on the objective lens 10 as the collimated light in use of any of the optical discs D1, D2 and D3. There are shown in Tables 25, 26, and 27 concrete specifications of the optical information read/write device 100 including the objective lens 10 configured with the specifications shown in Table 24 in use of the optical discs D1, D2, and D3, respectively.

TABLE 25

| Surface No. | r [mm] | d [mm] | n (405 nm) | Remarks |
|---|---|---|---|---|
| 0 | | 2.81 | | Light Source 1A |
| 1 | ∞ | 2.00 | 1.52972 | Diffraction Grating 2A |
| 2 | ∞ | 13.00 | | |
| 3 | 85.710 | 1.50 | 1.52469 | Coupling Lens 3A |
| 4 | −10.550 | 1.00 | | |
| 5 | ∞ | 4.00 | 1.52972 | Beam Splitter 41 |
| 6 | ∞ | 1.00 | | |
| 7 | ∞ | 4.00 | 1.52972 | Beam Splitter 42 |
| 8 | ∞ | 3.09 | | |
| 9 | 1.855 | 1.90 | 1.52469 | Objective Lens 10 |
| 10 | −6.730 | 1.57 | | |
| 11 | ∞ | 0.60 | 1.62231 | Optical Disk D1 |
| 12 | ∞ | — | | |

TABLE 26

| Surface No. | r [mm] | d [mm] | n (660 nm) | Remarks |
|---|---|---|---|---|
| 0 | | 2.79 | | Light Source 1B |
| 1 | ∞ | 2.00 | 1.51374 | Diffraction Grating 2B |
| 2 | ∞ | 13.00 | | |
| 3 | 101.820 | 1.50 | 1.54044 | Coupling Lens 3B |
| 4 | −10.700 | 1.00 | | |
| 5 | ∞ | 4.00 | 1.51374 | Beam Splitter 41 |
| 6 | ∞ | 1.00 | | |
| 7 | ∞ | 4.00 | 1.51374 | Beam Splitter 42 |
| 8 | ∞ | 3.00 | | |
| 9 | 1.855 | 1.90 | 1.50635 | Objective Lens 10 |
| 10 | −6.730 | 1.66 | | |
| 11 | ∞ | 0.60 | 1.57961 | Optical Disk D2 |
| 12 | ∞ | — | | |

TABLE 27

| Surface No. | r [mm] | d [mm] | n (790 nm) | Remarks |
|---|---|---|---|---|
| 0 | | 2.79 | | Light Source 1C |
| 1 | ∞ | 2.00 | 1.51052 | Diffraction Grating 2C |
| 2 | ∞ | 13.00 | | |
| 3 | 96.346 | 1.50 | 1.53653 | Coupling Lens 3C |
| 4 | −10.675 | 5.00 | | |
| 5 | ∞ | 4.00 | 1.51052 | Beam Splitter 42 |
| 6 | ∞ | 3.37 | | |
| 7 | 1.855 | 1.90 | 1.50313 | Objective Lens 10 |
| 8 | −6.730 | 1.29 | | |
| 9 | ∞ | 1.20 | 1.57307 | Optical Disk D3 |
| 10 | ∞ | — | | |

In addition, the second surface of each of the coupling lenses 3A to 3C, and both surfaces 11 and 12 of the objective lens 10 are aspheric. There are shown in Tables 28, 29, and 30 the conical coefficients and the aspheric coefficients for regulating the shape of each of the aspheric surfaces in the read/write operations on the first, second, and third optical discs D1, D2, and D3, respectively.

TABLE 28

| Surface No. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 | −0.6000 | −1.0540E−03 | −2.5650E−04 | −5.4320E−05 | −9.1620E−06 | −7.1840E−07 |
| 10 | 0.0000 | 2.1580E−02 | −6.4730E−03 | 1.4670E−03 | −2.0570E−04 | 1.3100E−05 |

TABLE 29

| Surface No. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 | −0.6000 | −1.0540E−03 | −2.5650E−04 | −5.4320E−05 | −9.1620E−06 | −7.1840E−07 |
| 10 | 0.0000 | 2.1580E−02 | −6.4730E−03 | 1.4670E−03 | −2.0570E−04 | 1.3100E−05 |

TABLE 30

| Surface No. | K | A4 | A6 | A8 | A10 | A12 |
|---|---|---|---|---|---|---|
| 4 | 0.0000 | −7.5630E−06 | −9.3160E−08 | 0.0000E+00 | 0.0000E+00 | 0.0000E+00 |
| 7 | −0.6000 | −1.0540E−03 | −2.5650E−04 | −5.4320E−05 | −9.1620E−06 | −7.1840E−07 |
| 8 | 0.0000 | 2.1580E−02 | −6.4730E−03 | 1.4670E−03 | −2.0570E−04 | 1.3100E−05 |

The phase shift structure provided on the first surface 11 of the objective lens 10 in the practical example 4 is defined by two kinds of optical path difference functions, i.e., the first and second optical path difference functions. There are shown in Table 31 coefficients $P_{2i}$ in each of the optical path difference functions. In addition, there are shown in Table 32 the diffraction orders m at which each of the laser beams takes the maximum diffraction efficiency.

TABLE 31

| 1st Surface 11 | P2 | P4 | P6 | P8 | P10 | P12 |
|---|---|---|---|---|---|---|
| 1st OPDF | 0.0000E+00 | −9.7470E−01 | −7.6390E−02 | −1.0530E−02 | 0.0000E+00 | 0.0000E+00 |
| 2nd OPDF | 0.0000E+00 | 6.1180E−01 | 4.0000E−04 | 2.1070E−02 | 0.0000E+00 | 0.0000E+00 |

TABLE 32

| Diffraction Order m | 1st Laser | 2nd Laser | 3rd Laser |
|---|---|---|---|
| 1st OPDF | 5 | 3 | 3 |
| 1st OPDF | 2 | 1 | 1 |

There are shown in Table 33 concrete specifications of the phase shift ring-shaped zone structure formed on the first surface 11 of the objective lens 10 in the practical example 4. Table 33 shows a range of each of the ring-shaped zones formed on the first surface 11 of the objective lens 10 in the practical example 4, and the optical path difference caused by the first laser beam being transmitted through each of the ring-shaped zones. The range of each of the ring-shaped zones is expressed with a pair of heights from the optical axis, hmin and hmax.

TABLE 33

| No. | hmin | hmax | \|ΔOPD1/λ1\| | \|ΔOPD2/λ1\| | \|ΔOPD1/λ3\| |
|---|---|---|---|---|---|
| 0 | 0.000 | 0.834 | | | |
| 1 | 0.834 | 0.944 | 5.21 | 0.00 | 2.56 |
| 2 | 0.944 | 1.086 | 0.00 | 2.00 | 0.00 |
| 3 | 1.086 | 1.224 | 5.21 | 0.00 | 2.56 |
| 4 | 1.224 | 1.323 | 5.21 | 2.00 | 2.56 |
| 5 | 1.323 | 1.380 | 5.21 | 0.00 | 2.56 |
| 6 | 1.380 | 1.402 | 0.00 | 2.00 | 0.00 |
| 7 | 1.402 | 1.467 | 5.21 | 0.00 | 2.56 |
| 8 | 1.467 | 1.487 | 5.21 | 0.00 | 2.56 |
| 9 | 1.487 | 1.523 | 0.00 | 2.00 | 0.00 |
| 10 | 1.523 | 1.572 | 5.21 | 0.00 | 2.56 |
| 11 | 1.572 | 1.616 | 5.21 | 2.00 | 2.56 |
| 12 | 1.616 | 1.638 | 5.21 | 0.00 | 2.56 |
| 13 | 1.638 | 1.656 | 0.00 | 2.00 | 0.00 |
| 14 | 1.656 | 1.692 | 5.21 | 0.00 | 2.56 |
| 15 | 1.692 | 1.726 | 5.21 | 2.00 | 2.56 |
| 16 | 1.726 | 1.735 | 5.21 | 0.00 | 2.56 |
| 17 | 1.735 | 1.757 | 0.00 | 2.00 | 0.00 |
| 18 | 1.757 | 1.786 | 5.21 | 0.00 | 2.56 |
| 19 | 1.786 | 1.814 | 5.21 | 2.00 | 2.56 |
| 20 | 1.814 | 1.829 | 5.21 | 0.00 | 2.56 |
| 21 | 1.829 | 1.839 | 0.00 | 2.00 | 0.00 |
| 22 | 1.839 | 1.864 | 5.21 | 0.00 | 2.56 |
| 23 | 1.864 | 1.887 | 5.21 | 2.00 | 2.56 |
| 24 | 1.887 | 1.898 | 5.21 | 0.00 | 2.56 |
| 25 | 1.898 | 1.909 | 0.00 | 2.00 | 0.00 |
| 26 | 1.909 | 1.930 | 5.21 | 0.00 | 2.56 |
| 27 | 1.930 | 1.950 | 5.21 | 2.00 | 2.56 |

The objective lens 10 of the optical information read/write device 100 in the practical example 4 satisfies the condition (1), as the Abbe number vd is equal to 58. In addition, as show in Table 33, the optical path difference |ΔOPD1/λ1| given to the first laser beam by each of the first steps is 5.21 (i.e., N=2), and therefore satisfies the conditions (17) and (20). Moreover, the optical path difference |ΔOPD1/λ3| given to the third laser beam by each of the first steps is 2.56, and therefore satisfies the condition (21) as well.

Further, the optical path difference |ΔOPD2/λ1| given to the first laser beam by each of the second steps is 2.00 (i.e., N=1), and therefore satisfies the conditions (27) and (28).

Here, in the optical information read/write device 100 in the practical example 4, there are shown in Table 34 concrete specifications of the optical system for detecting a focus error signal in the read/write operations on the third optical disc D3.

TABLE 34

| Surface No. | r [mm] | d [mm] | n (660 nm) | Remarks |
|---|---|---|---|---|
| 11 | ∞ | 1.20 | 1.57307 | Optical Disk D3 |
| 12 | ∞ | 1.29 | | |
| 13 | 6.730 | 1.90 | 1.50313 | Objective Lens 10 |
| 14 | −1.855 | 3.37 | | |
| 15 | ∞ | 4.00 | 1.51052 | Beam Splitter 42 |
| 16 | ∞ | 5.00 | | |
| 17 | 10.675 | 1.50 | 1.53653 | Coupling Lens 3C |
| 18 | −96.346 | 9.00 | | |
| 19 | ∞ | 2.20 | 1.51052 | Half Mirror 5C |
| 20 | ∞ | 7.58 | | |
| 21 | ∞ | — | | Light Receiving Portion 6C |

FIG. 14 shows a focus error signal detected by the light receiving portion 6C in the read/write operations on the third optical disc D3 in the optical information read/write device 100 in the practical example 4. As shown in FIG. 14, the focus error signal detected by the light receiving portion 6C has a favorable waveform with small deformation. Namely, the optical information read/write device 100 in the practical example 4 achieves the same effects as the device 100 in the practical example 3 with each of the aforementioned conditions being satisfied.

FIGS. 15A, 15B, and 15C show spherical aberrations generated in use of the first, second, and third laser beams in the optical information read/write device 100 in the practical example 4, respectively. As shown in FIGS. 15A, 15B, and 15C, the optical information read/write device 100 with the objective lens 10 incorporated therein in the practical example 4 can sufficiently compensate the spherical aberration even in the read/write operations on any of the optical discs D1 to D3, so as to form a suitable beam spot on the recording surface for the read/write operations. Hereinabove, the optical information read/write device 100 in the practical example 4 has been described.

Practical Example 5

The practical example 5 is a specific practical example of the optical information read/write device 100 in the second embodiment. There are shown in Table 35 concrete specifications of the objective lens 10 in the practical example 5.

TABLE 35

| | 1st Laser | 2nd Laser | 3rd Laser |
|---|---|---|---|
| Wavelength [nm] | 405 | 660 | 790 |
| Focal Length [mm] | 3.000 | 3.101 | 3.122 |
| NA | 0.650 | 0.600 | 0.509 |
| Magnification M | 0.000 | 0.000 | 0.000 |

As shown by the magnifications in Table 35, in the practical example 5 as well as the practical examples 3 and 4, the laser beam is incident on the objective lens 10 as the collimated light in use of any of the optical discs D1, D2 and D3. There are shown in Tables 36, 37, and 38 concrete specifications of the optical information read/write device 100 including the objective lens 10 configured with the specifications shown in Table 35 in use of the optical discs D1, D2, and D3, respectively.

TABLE 36

| Surface No. | r [mm] | d [mm] | n (405 nm) | Remarks |
|---|---|---|---|---|
| 0 | | 2.81 | | Light Source 1A |
| 1 | ∞ | 2.00 | 1.52972 | Diffraction Grating 2A |
| 2 | ∞ | 13.00 | | |
| 3 | 85.710 | 1.50 | 1.52469 | Coupling Lens 3A |
| 4 | −10.550 | 1.00 | | |
| 5 | ∞ | 4.00 | 1.52972 | Beam Splitter 41 |
| 6 | ∞ | 1.00 | | |
| 7 | ∞ | 4.00 | 1.52972 | Beam Splitter 42 |
| 8 | ∞ | 3.07 | | |
| 9 (1st Area) | 1.830 | 1.90 | 1.52469 | Objective Lens 10 |
| 9 (2nd Area) | 1.855 | | | |
| 9 (3rd Area) | 1.855 | | | |
| 10 | −6.999 | 1.57 | | |
| 11 | ∞ | 0.60 | 1.62231 | Optical Disk D1 |
| 12 | ∞ | — | | |

TABLE 37

| Surface No. | r [mm] | d [mm] | n (660 nm) | Remarks |
|---|---|---|---|---|
| 0 | | 2.79 | | Light Source 1B |
| 1 | ∞ | 2.00 | 1.51374 | Diffraction Grating 2B |
| 2 | ∞ | 13.00 | | |
| 3 | 101.820 | 1.50 | 1.54044 | Coupling Lens 3B |
| 4 | −10.700 | 1.00 | | |
| 5 | ∞ | 4.00 | 1.51374 | Beam Splitter 41 |
| 6 | ∞ | 1.00 | | |
| 7 | ∞ | 4.00 | 1.51374 | Beam Splitter 42 |
| 8 | ∞ | 3.00 | | |
| 9 (1st Area) | 1.830 | 1.90 | 1.50635 | Objective Lens 10 |
| 9 (2nd Area) | 1.855 | | | |
| 9 (3rd Area) | 1.855 | | | |
| 10 | −6.999 | 1.66 | | |
| 11 | ∞ | 0.60 | 1.57961 | Optical Disk D2 |
| 12 | ∞ | — | | |

TABLE 38

| Surface No. | r [mm] | d [mm] | n (790 nm) | Remarks |
|---|---|---|---|---|
| 0 | | 2.79 | | Light Source 1C |
| 1 | ∞ | 2.00 | 1.51052 | Diffraction Grating 2C |
| 2 | ∞ | 13.00 | | |
| 3 | 96.346 | 1.50 | 1.53653 | Coupling Lens 3C |
| 4 | −10.675 | 5.00 | | |
| 5 | ∞ | 4.00 | 1.51052 | Beam Splitter 42 |
| 6 | ∞ | 3.36 | | |
| 7 (1st Area) | 1.830 | 1.90 | 1.50313 | Objective Lens 10 |
| 7 (2nd Area) | 1.855 | | | |
| 7 (3rd Area) | 1.855 | | | |

TABLE 38-continued

| Surface No. | r [mm] | d [mm] | n (790 nm) | Remarks |
|---|---|---|---|---|
| 8 | −6.999 | 1.28 | | |
| 9 | ∞ | 1.20 | 1.57307 | Optical Disk D3 |
| 10 | ∞ | — | | |

It is noted that, according to Table 35, "f1×NA1" is equal to 1.950, and "f2×NA2" is 1.861. Namely, the optical information read/write device 100 in the practical example 5 satisfies the condition (29). There are formed on the first surface 11 of the objective lens 10 in the practical example 5 the first area including the phase shift ring-shaped zone structure that gives two kinds of optical path differences, the second area including the phase shift structure having the aperture regulating function for the third laser beam, and the third area including the phase shift structure having the aperture regulating function for the second laser beam. The range of each of the area on the first surface 11 is expressed by the height "h" from the optical axis AX as follows:

(the first area) $h \leq 1.590$,
(the second area) $1.590 < h \leq 1.860$,
(the third area) $1.860 < h \leq 1.950$.

The second surface of each of the coupling lenses 3A to 3C, and both surfaces 11 and 12 of the objective lens 10 are aspheric. There are shown in Tables 39, 40, and 41 the conical coefficients and the aspheric coefficients for regulating the shape of each of the aspheric surfaces in the read/write operations on the first, second, and third optical discs D1, D2, and D3, respectively. It is noted that as shown in Tables 39, 40, and 41, the aspheric shapes in the first, second, and third areas on the first surface 11 of the objective lens 10 are different from each other.

TABLE 39

| Surface No. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 (1st Area) | −0.6000 | −2.5340E−04 | −3.1690E−04 | −1.5740E−04 | 8.7050E−06 | −3.2680E−06 |
| 9 (2nd Area) | −0.6000 | 2.8410E−03 | −2.4390E−03 | 1.1810E−03 | −3.0750E−04 | 2.3905E−05 |
| 9 (3rd Area) | −0.6000 | −4.1750E−03 | 3.4250E−03 | −1.9330E−04 | −2.8520E−04 | 4.0974E−05 |
| 10 | 0.0000 | 2.5300E−02 | −1.1470E−02 | 3.9200E−03 | −8.2770E−04 | 7.8510E−05 |

TABLE 40

| Surface No. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 (1st Area) | −0.6000 | −2.5340E−04 | −3.1690E−04 | −1.5740E−04 | 8.7050E−06 | −3.2680E−06 |
| 9 (2nd Area) | −0.6000 | 2.8410E−03 | −2.4390E−03 | 1.1810E−03 | −3.0750E−04 | 2.3905E−05 |
| 9 (3rd Area) | −0.6000 | −4.1750E−03 | 3.4250E−03 | −1.9330E−04 | −2.8520E−04 | 4.0974E−05 |
| 10 | 0.0000 | 2.5300E−02 | −1.1470E−02 | 3.9200E−03 | −8.2770E−04 | 7.8510E−05 |

TABLE 41

| Surface No. | K | A4 | A6 | A8 | A10 | A12 |
|---|---|---|---|---|---|---|
| 4 | 0.0000 | −7.5630E−06 | −9.3160E−08 | 0.0000E+00 | 0.0000E+00 | 0.0000E+00 |
| 7 (1st Area) | −0.6000 | −2.5340E−04 | −3.1690E−04 | −1.5740E−04 | 8.7050E−06 | −3.2680E−06 |
| 7 (2nd Area) | −0.6000 | 2.8410E−03 | −2.4390E−03 | 1.1810E−03 | −3.0750E−04 | 2.3905E−05 |
| 7 (3rd Area) | −0.6000 | −4.1750E−03 | 3.4250E−03 | −1.9330E−04 | −2.8520E−04 | 4.0974E−05 |
| 8 | 0.0000 | 2.5300E−02 | −1.1470E−02 | 3.9200E−03 | −8.2770E−04 | 7.8510E−05 |

In the phase shift structure formed on the second surface of the objective lens 10 in the practical example 5, the first area is defined by two kinds of optical path difference functions, the first optical path difference function and the second optical path difference function. The second and third areas are defined by one kind of optical path difference function. There are shown in Table 42 coefficients $P_{2i}$ in each of the optical path difference functions by which each of the areas is defined. In addition, there are shown in Table 43 the diffraction orders m at which each of the laser beams takes the maximum diffraction efficiency.

TABLE 42

| | P2 | P4 | P6 | P8 | P10 | P12 |
|---|---|---|---|---|---|---|
| 1st Area, 1st OPDF | 0.0000E+00 | −9.9860E−01 | −3.9970E−02 | −1.9780E−02 | 0.0000E+00 | 0.0000E+00 |
| 2nd Area, 2nd OPDF | −8.7956E−01 | −7.2940E−01 | 5.7610E−02 | −3.3140E−02 | 0.0000E+00 | 0.0000E+00 |
| 3rd Area, 1st OPDF | −2.6387E+00 | −6.5998E−01 | −5.5570E−01 | 0.0000E+00 | 0.0000E+00 | 0.0000E+00 |
| 1st Area, 2nd OPDF | 1.0659E+00 | −2.9230E−01 | −1.3470E−01 | 1.8380E−02 | 0.0000E+00 | 0.0000E+00 |

TABLE 43

| Diffraction Order m | 1st Laser | 2nd Laser | 3rd Laser |
| --- | --- | --- | --- |
| 1st Area, 1st OPDF | 3 | 2 | 2 |
| 2nd Area, 2nd OPDF | 3 | 2 | |
| 3rd Area, 1st OPDF | 1 | | |
| 1st Area, 2nd OPDF | 2 | 1 | 1 |

There are shown in Table 44 concrete specifications of the phase shift ring-shaped zone structure formed on the first surface 11 of the objective lens 10 in the practical example 5. Table 44 shows a range of each of the ring-shaped zones formed on the first surface 11 of the objective lens 10 in the practical example 5, and the optical path difference caused by the first laser beam being transmitted through each of the ring-shaped zones. The range of each of the ring-shaped zones is expressed with a pair of heights from the optical axis, hmin and hmax.

TABLE 44

| No. | hmin | hmax | $|\Delta OPD1/\lambda 1|$ | $|\Delta OPD2/\lambda 1|$ | $|\Delta OPD1/\lambda 3|$ | Remarks |
| --- | --- | --- | --- | --- | --- | --- |
| 0 | 0.000 | 0.766 | | | | 1st Area |
| 1 | 0.766 | 0.834 | 0.00 | 2.03 | 0.00 | |
| 2 | 0.834 | 1.087 | 3.21 | 0.00 | 1.58 | |
| 3 | 1.087 | 1.227 | 3.21 | 0.00 | 1.58 | |
| 4 | 1.227 | 1.281 | 3.21 | 0.00 | 1.58 | |
| 5 | 1.281 | 1.327 | 0.00 | 2.03 | 0.00 | |
| 6 | 1.327 | 1.405 | 3.21 | 0.00 | 1.58 | |
| 7 | 1.405 | 1.470 | 3.21 | 0.00 | 1.58 | |
| 8 | 1.470 | 1.526 | 3.21 | 0.00 | 1.58 | |
| 9 | 1.526 | 1.575 | 3.21 | 0.00 | 1.58 | |
| 10 | 1.575 | 1.590 | 3.21 | 2.03 | 1.58 | |
| 11 | 1.590 | 1.652 | 3.21 | | | 2nd Area |
| 12 | 1.652 | 1.698 | 3.25 | | | |
| 13 | 1.698 | 1.739 | 3.25 | | | |
| 14 | 1.739 | 1.776 | 3.25 | | | |
| 15 | 1.776 | 1.810 | 3.25 | | | |
| 16 | 1.810 | 1.841 | 3.25 | | | |
| 17 | 1.841 | 1.861 | 3.25 | | | |
| 18 | 1.861 | 1.874 | 3.25 | | | 3rd Area |
| 19 | 1.874 | 1.884 | 1.00 | | | |
| 20 | 1.884 | 1.893 | 1.00 | | | |
| 21 | 1.893 | 1.902 | 1.00 | | | |
| 22 | 1.920 | 1.911 | 1.00 | | | |
| 23 | 1.911 | 1.920 | 1.00 | | | |
| 24 | 1.920 | 1.928 | 1.00 | | | |
| 25 | 1.928 | 1.937 | 1.00 | | | |
| 26 | 1.937 | 1.950 | 1.00 | | | |

As aforementioned, the objective lens 10 in the practical example 5 is formed with the different phase shift ring-shaped zone structures between the areas on the first surface 11. Accordingly, as shown in Table 44, the optical path differences given to the first laser beam are different between the areas.

The objective lens 10 of the optical information read/write device 100 in the practical example 5 satisfies the condition (1), as the Abbe number vd is equal to 58. In addition, as shown in Table 44, the optical path difference $|\Delta OPD1/\lambda 1|$ given to the first laser beam by each of the first steps is 3.21 (i.e., N=1), and therefore satisfies the conditions (17) and (18). In addition, the optical path difference $|\Delta OPD1/\lambda 3|$ given to the third laser beam by each of the first steps is 1.58, and therefore satisfies the condition (19) as well.

Further, the optical path difference $|\Delta OPD2/\lambda 1|$ given to the first laser beam by each of the second steps is 2.03 (i.e., N=1), and therefore satisfies the conditions (27) and (28).

Here, in the optical information read/write device 100 in the practical example 5, there are shown in Table 45 concrete specifications of the optical system for detecting a focus error signal in the read/write operations on the third optical disc D3.

TABLE 45

| Surface No. | r [mm] | d [mm] | n (790 nm) | Remarks |
| --- | --- | --- | --- | --- |
| 11 | ∞ | 1.20 | 1.57307 | Optical Disk D3 |
| 12 | ∞ | 1.28 | | |
| 13 | 6.999 | 1.90 | 1.50313 | Objective Lens 10 |
| 14 (1st Area) | −1.830 | 3.37 | | |
| 14 (2nd Area) | −1.855 | | | |
| 14 (3rd Area) | −1.855 | | | |
| 15 | ∞ | 4.00 | 1.51052 | Beam Splitter 42 |
| 16 | ∞ | 5.00 | | |
| 17 | 10.675 | 1.50 | 1.53653 | Coupling Lens 3C |
| 18 | −96.346 | 9.00 | | |
| 19 | ∞ | 2.20 | 1.51052 | Half Mirror 5C |
| 20 | ∞ | 7.58 | | |
| 21 | ∞ | — | | Light Receiving Portion 6C |

FIG. 16 shows a focus error signal detected by the light receiving portion 6C in the read/write operations on the third optical disc D3 in the optical information read/write device 100 in the practical example 5. As shown in FIG. 16, the focus error signal detected by the light receiving portion 6C has a favorable waveform with small deformation. Namely, the optical information read/write device 100 in the practical example 5 achieves the same effects as the device 100 in each of the practical examples 3 and 4 with the aforementioned conditions being satisfied.

FIGS. 17A, 17B, and 17C show spherical aberrations generated in use of the first, second, and third laser beams in the optical information read/write device 100 in the practical example 5, respectively. As shown in FIGS. 17A, 171, and 17C, the optical information read/write device 100 with the objective lens 10 incorporated therein in the practical example 5 can sufficiently compensate the spherical aberration even in the read/write operations on any of the optical discs D1 to D3, so as to form a suitable beam spot on the recording surface for the read/write operations. Hereinabove, the optical information read/write device 100 in the practical example 5 has been described.

Practical Example 6

The objective lens 10 in the practical example 6 is preferably employed in the optical information read/write device 100 that is as shown in FIG. 1 and is especially the device 100 in the practical example 1. The objective lens 10 in the practical example 6 has the phase shift ring-shaped zone structure configured only with the steps that give one kind of optical path difference on the first surface 11. There are shown in Table 46 concrete specifications of the objective lens 10 in the practical example 6. In addition, in the phase shift ring-shaped zone structure, there is shown in Table 47 the diffraction order m at which each of the laser beams takes the maximum diffraction efficiency.

TABLE 46

| | 1st Laser | 2nd Laser | 3rd Laser |
| --- | --- | --- | --- |
| Wavelength [nm] | 405 | 660 | 790 |
| Abbe Number vd | | 27 | |
| Refractive Index | 1.65098 | 2.59978 | 1.59073 |

TABLE 47

|  | 1st Laser | 2nd Laser | 3rd Laser |
|---|---|---|---|
| Diffraction Order m | 3 | 2 | 1 |

The objective lens 10 configured as aforementioned in the practical example 6 satisfies the conditions (8) and (9), as the optical path difference $|\Delta OPD/\lambda 1|$ given to the first laser beam by the step at the boundary between each couple of adjacent ring-shaped zones is 2.95 (i.e., N=1). In addition, the optical path difference $|\Delta OPD/\lambda 3|$ given to the third laser beam by the step at the boundary between each couple of adjacent ring-shaped zones is 1.58, and therefore satisfies the condition (10) as well.

Practical Example 7

The objective lens 10 in the practical example 7 is preferably employed in the optical information read/write device 100 that is as shown in FIG. 1 and is especially the device 100 in the practical example 1, in the same manner as the practical example 6. The objective lens 10 in the practical example 7 has the phase shift ring-shaped zone structure configured only with the steps that give one kind of optical path difference on the first surface 11. There are shown in Table 48 concrete specifications of the objective lens 10 in the practical example 7. In addition, in the phase shift ring-shaped zone structure, there is shown in Table 49 the diffraction order m at which each of the laser beams takes the maximum diffraction efficiency. It is noted that the objective lens 10 in the practical example 7 satisfies the condition (7) as understood from Table 48.

TABLE 48

|  | 1st Laser | 2nd Laser | 3rd Laser |
|---|---|---|---|
| Wavelength [nm] | 405 | 660 | 790 |
| Abbe Number vd |  | 27 |  |
| Refractive Index | 1.65098 | 1.59978 | 1.59073 |

TABLE 49

|  | 1st Laser | 2nd Laser | 3rd Laser |
|---|---|---|---|
| Diffraction Order m | 5 | 3 | 2 |

The objective lens 10 configured as aforementioned in the practical example 7 satisfies the conditions (8) and (11), as the optical path difference $|\Delta OPD/\lambda 1|$ given to the first laser beam by the step at the boundary between each couple of adjacent ring-shaped zones is 5.17 (i.e., N=2). In addition, the optical path difference $|\Delta OPD/\lambda 3|$ given to the third laser beam by the step at the boundary between each couple of adjacent ring-shaped zones is 2.48, and therefore satisfies the condition (12) as well.

Next, a comparison of the focus error signals between the optical information read/write device 100 (the objective lens 10) and a device provided with a conventional objective lens will be made. There is assumed as an objective lens in a comparative example an objective lens having the phase shift structure configured such that the value of the condition (3) is 3.00. There is shown in Table 50 the diffraction efficiency of each of the laser beams in use of a corresponding one of the optical discs D1 to D3 in each of the practical examples 1 to 7. In addition, there is shown in Table 51 the diffraction efficiency of each of the laser beams in use of a corresponding one of the optical discs D1 to D3 in the comparative example. Further, there is shown in FIG. 18 a focus error signal in the comparative example.

TABLE 50

| Diffraction Efficiency [%] | Ex. 1 | Ex. 2 | Ex. 3 | Ex. 4 | Ex. 5 | Ex. 6 | Ex. 7 |
|---|---|---|---|---|---|---|---|
| 1st Laser | 91.3 | 97.8 | 85.9 | 86.7 | 86.5 | 99.1 | 91.1 |
| 2nd Laser | 94.9 | 90.4 | 89.6 | 87.3 | 88.2 | 68.4 | 98.0 |
| 3rd Laser |  |  |  |  |  |  |  |
| Intended Order Diffracted Light | 49.8 | 43.0 | 53.2 | 50.4 | 53.2 | 62.1 | 56.6 |
| Unnecessary Order Diffracted Light | 31.8 | 38.1 | 28.8 | 31.3 | 28.8 | 21.7 | 26.0 |

TABLE 51

| Diffraction Efficiency [%] | Comparative Example |
|---|---|
| 1st Laser | 100.0 |
| 2nd Laser | 84.6 |
| 3rd Laser |  |
| Intended Order Diffracted Light | 36.5 |
| Unnecessary Order Diffracted Light | 44.7 |

In Table 50, the orders of the intended order diffracted light and unnecessary order diffracted light in use of the third disc D3 are as follows, respectively: second order and first order in the practical examples 1 to 3, and 5; third order and second order in the practical example 4; first order and second order in the practical example 6; and second order and third order in the practical example 7.

As understood by comparing Table 50 with Table 51, in the comparative example, the diffraction efficiency of the intended order diffracted light in use of the third disc D3 is low, while the diffraction efficiency of the unnecessary order diffracted light is high. Therefore, as shown in FIG. 18, the waveform of the focus error signal is so deformed that the focusing function is deteriorated.

In contrast, in each of the practical examples 1 to 7, as shown in Table 50, the diffraction efficiency of the intended order diffracted light in use of the third optical disc is high, while the diffraction efficiency of the unnecessary order diffracted light is low. Furthermore, the intended order diffracted light of the first and second laser beams maintains high diffraction efficiency such that the read/write operations are appropriately performed even on the optical discs D2 and D3 with high recording densities. In other words, the objective lens in accordance with one or more aspects of the present invention or the optical information read/write device provided with the same can prevent the focus error signal from being deformed, and prevent the focusing function from being deteriorated.

Hereinabove, the embodiments according to one or more aspects of the present invention have been described. However, the present invention is not limited to the aforementioned embodiments, and various sorts of modifications as exemplified below may be possible as far as they are within a scope of the present invention.

The objective lens for the optical information read/write device according to one or more aspects of the present invention is not limited to the concrete specifications as shown in each of the practical examples. The number of optical elements such as a lens constituting the objective optical system of the optical information read/write device may be two or more. When the objective optical system is configured with two or more optical elements, an optical element designed based upon a design method according to one or more aspects of the present invention may be provided with the phase shift structure not only on one side surface thereof, but also on each of the both side surfaces.

In addition, as shown in each of the aforementioned embodiments, the focal lengths of the coupling lenses 3A to 3C, which are arranged between each pair of the respective light sources 1A to 1C and the respective optical discs D1 to D3, differ according to the refractive indexes dependent on the wavelengths thereof. The optical information read/write device according to one or more aspects of the present invention may be configured such that the laser beam emitted from each of the light sources 1A to 1C is introduced on the recording surface via a common coupling lens. In the case where such a configuration is applied, when the light source 1A that emits the first laser beam and the light source 1B that emits the second laser beam are mounted on the same board, namely, the light sources are away from the common coupling lens by the same distance, at least one of the first laser beam and the second laser beam cannot help being converging light or diverging light. Even in this case, if the objective lens is arranged such that the imaging magnification is as low as possible satisfying the aforementioned conditions (13) and (14), the same effects as each of the aforementioned practical examples can be achieved.

The present disclosure relates to the subject matter contained in Japanese Patent Application No. P2005-149323, filed on May 23, 2005, which is expressly incorporated herein by reference in its entirety.

What is claimed is:

1. An objective lens to be employed for an optical information read/write device that is configured to perform read/write operations for reading and/or writing information on each of a plurality of kinds of optical discs using a corresponding one of a plurality of kinds of laser beams having different wavelengths, the plurality of kinds of laser beams including three kinds of laser beams that have a first wavelength $\lambda 1$ (nm), a second wavelength $\lambda 2$ (nm), and a third wavelength $\lambda 3$ (nm) according to a relationship $\lambda 1 < \lambda 2 < \lambda 3$, respectively, the objective lens comprising a phase shift structure on at least one surface of the objective lens that has a plurality of ring-shaped refractive surface zones into which the at least one surface is concentrically divided, wherein the objective lens is made of material with an Abbe number vd satisfying a condition:

$$40 \leq \nu d \leq 80, \text{ and}$$

wherein the phase shift structure has a step between each couple of the adjacent refractive surface zones that gives an optical path difference to an incident laser beam, and wherein the phase shift structure is configured to satisfy a condition:

$$3.04 < |\Delta OPD/\lambda 1| < 3.29,$$

where $\Delta OPD$ represents the optical path difference (nm) that the step gives to the laser beam with the first wavelength $\lambda 1$.

2. The objective lens according to claim 1, wherein the phase shift structure is configured to satisfy a condition:

$$1.50 < |\Delta OPD/\lambda 3| < 1.62.$$

3. An objective lens to be employed for an optical information read/write device that is configured to perform read/write operations for reading and/or writing information on each of a plurality of kinds of optical discs using a corresponding one of a plurality of kinds of laser beams having different wavelengths, the plurality of kinds of laser beams including three kinds of laser beams that have a first wavelength $\lambda 1$ (nm), a second wavelength $\lambda 2$ (nm), and a third wavelength $\lambda 3$ (nm) according to a relationship $\lambda 1 < \lambda 2 < \lambda 3$, respectively, the objective lens comprising a phase shift structure on at least one surface of the objective lens that has a plurality of ring-shaped refractive surface zones into which the at least one surface is concentrically divided, wherein the objective lens is made of material with an Abbe number vd satisfying a condition:

$$40 \leq \nu d \leq 80, \text{ and}$$

wherein the phase shift structure has a step between each couple of the adjacent refractive surface zones that gives an optical path difference to an incident laser beam, and wherein the phase shift structure is configured to satisfy a condition:

$$5.07 < |\Delta OPD/\lambda 1| < 5.25,$$

where $\Delta OPD$ represents the optical path difference (nm) that the step gives to the laser beam with the first wavelength $\lambda 1$.

4. The objective lens according to claim 3, wherein the phase shift structure is configured to satisfy a condition:

$$2.50 < |\Delta OPD/\lambda 3| < 2.58.$$

5. An optical information read/write device configured to perform read/write operations for reading and/or writing information on each of a plurality of kinds of optical discs using a corresponding one of a plurality of kinds of laser beams having different wavelengths, the optical information read/write device comprising an objective lens that has a phase shift structure on at least one surface of the objective lens that has a plurality of ring-shaped refractive surface zones into which the at least one surface is concentrically divided, wherein the plurality of kinds of laser beams includes three kinds of laser beams that have a first wavelength $\lambda 1$ (nm), a second wavelength $\lambda 2$ (nm), and a third wavelength $\lambda 3$ (nm) according to a relationship $\lambda 1 < \lambda 2 < \lambda 3$, respectively, and wherein the plurality of kinds of optical discs includes:

a first optical disc with a protective layer whose thickness t1 is approximately 0.6 mm, on which the read/write operations are performed using the laser beam with the first wavelength $\lambda 1$;

a second optical disc with a protective layer whose thickness t2 is approximately 0.6 mm, on which the read/write operations are performed using the laser beam with the second wavelength $\lambda 2$; and a third optical disc with a protective layer whose thickness is approximately 1.2 mm, on which the read/write operations are performed using the laser beam with the third wavelength $\lambda 3$, and wherein the optical information read/write device is configured to satisfy relationships NA1>NA3 and NA2>NA3, where NA1, NA2, and NA3 represent numerical apertures necessary for the read/write operations on the first optical disc, the second optical disc, and the third optical disc, respectively, and wherein the optical information read/write device is configured such that the laser beams with the first and second wavelengths $\lambda 1$ and $\lambda 2$ are incident on the objective lens substantially as collimated light, and the laser beam with the third wavelength $\lambda 3$ is incident on the objective lens as diverging light, and wherein the objective lens is made of material with an Abbe number νd satisfying a condition:

$40 \leq \nu d \leq 80$, and wherein the phase shift structure has a step between each couple of the adjacent refractive surface zones that gives an optical path difference to an incident laser beam, and wherein the phase shift structure is configured to satisfy a condition:

$3.04 < |\Delta OPD/\lambda 1| < 3.29$, in a first area configured to converge the laser beam with the third wavelength λ3 on a recording surface of the third optical disc, where ΔOPD (nm) represents the optical path difference that the step gives to the laser beam with the first wavelength λ1, and wherein the optical information read/write device is configured to satisfy conditions:

$-0.02 < f1 \times M1 < 0.02$;

$-0.02 < f2 \times M2 < 0.02$; and $-0.12 < f3 \times M3 < -0.04$, where M1 and f1 represent an imaging magnification and a focal length in the read/write operations on the first optical disc, respectively, and M2 and f2 represent an imaging magnification and a focal length in the read/write operations on the second optical disc, respectively, and M3 and f3 represent an imaging magnification and a focal length in the read/write operations on the third optical disc, respectively.

6. The optical information read/write device according to claim 5, wherein the phase shift structure is configured to satisfy a condition:

$1.50 < |\Delta OPD/\lambda 3| < 1.62$.

7. The optical information read/write device according to claim 5, wherein the phase shift structure includes a second area outside the first area, and wherein the second area is configured to converge each of the laser beams with the first and second wavelengths on the recording surfaces of the first and second optical discs, and not to converge the laser beam with the third wavelength, and wherein the second area includes a step between each couple of the adjacent refractive surface zones, the steps giving at least one kind of optical path difference to an incident laser beam, and wherein an absolute value of the at least one kind of optical path difference given by the steps in the second area is different from an absolute value of the optical path difference given by the steps in the first area.

8. The optical information read/write device according to claim 7, which is configured to satisfy a condition:

$f1 \times NA1 > f2 \times NA2$, where f1 and f2 represent focal lengths in the read/write operations on the first and second optical discs, respectively, wherein the phase shift structure includes a third area outside the second area, and wherein the third area is configured to converge only the laser beam with the first wavelength on the recording surface of the first optical disc, and not to converge the laser beams with the second and third wavelengths, and wherein the third area includes a step between each couple of the adjacent refractive surface zones, the steps giving at least one kind of optical path difference to an incident laser beam, and wherein an absolute value of the at least one kind of optical path difference given by the steps in the third area is different from the absolute value of the at least one kind of optical path difference given by the steps in the second area.

9. The optical information read/write device according to claim 7, which is configured to satisfy a condition:

$f1 \times NA1 < f2 \times NA2$, where f1 and f2 represent focal lengths in the read/write operations on the first and second optical discs, respectively, wherein the phase shift structure includes a third area outside the second area, and wherein the third area is configured to converge only the laser beam with the first wavelength on the recording surface of the first optical disc, and not to converge the laser beams with the second and third wavelengths, and wherein the third area includes a step between each couple of the adjacent refractive surface zones, the steps giving at least one kind of optical path difference to an incident laser beam, and wherein an absolute value of the at least one kind of optical path difference given by the steps in the third area is different from the absolute value of the at least one kind of optical path difference given by the steps in the second area.

10. An optical information read/write device configured to perform read/write operations for reading and/or writing information on each of a plurality of kinds of optical discs using a corresponding one of a plurality of kinds of substantially collimated laser beams having different wavelengths, the optical information read/write device comprising an objective lens that has a phase shift structure on at least one surface of the objective lens that has a plurality of ring-shaped refractive surface zones into which the at least one surface is concentrically divided, wherein the plurality of kinds of laser beams includes three kinds of laser beams that have a first wavelength λ1 (nm), a second wavelength λ2 (nm), and a third wavelength λ3 (nm) according to a relationship λ1<λ2<λ3, respectively, and wherein the plurality of kinds of optical discs includes:

a first optical disc with a protective layer whose thickness t1 is approximately 0.6 mm, on which the read/write operations are performed using the laser beam with the first wavelength λ1;

a second optical disc with a protective layer whose thickness t2 is approximately 0.6 mm, on which the read/write operations are performed using the laser beam with the second wavelength λ2; and a third optical disc with a protective layer whose thickness is approximately 1.2 mm, on which the read/write operations are performed using the laser beam with the third wavelength λ3, and wherein the optical information read/write device is configured to satisfy relationships NA1>NA3 and NA2>NA3, where NA1, NA2, and NA3 represent numerical apertures necessary for the read/write operations on the first optical disc, the second optical disc, and the third optical disc, respectively, and wherein the objective lens is made of material with an Abbe number νd satisfying a condition:

$$40 \leq \nu d \leq 80, \text{ and}$$

wherein the phase shift structure has at least two kinds of steps, each of the steps between each couple of the adjacent refractive surface zones giving an optical path difference to an incident laser beam, and wherein the phase shift structure is configured to satisfy a condition:

$$3.04 < |\Delta OPD1/\lambda 1| < 3.29,$$

in a first area configured to converge the laser beam with the third wavelength λ3 on a recording surface of the third optical disc, where ΔOPD1 (nm) represents the optical path difference that at least one of the at least two kinds of steps give to the laser beam with the first wavelength λ1.

11. The optical information read/write device according to claim 10, wherein the phase shift structure is configured to satisfy a condition:

$$1.50 < |\Delta OPD1/\lambda 3| < 1.62.$$

12. The optical information read/write device according to claim 11, wherein the phase shift structure is configured to satisfy a condition:

$$2N - 0.20 < |\Delta OPD2/\lambda 1| < 2N + 0.20,$$

where ΔOPD2 represents an optical path difference that the other of the at least two kinds of steps give to the laser beam with the first wavelength λ1.

13. The optical information read/write device according to claim 12, wherein the phase shift structure is configured to satisfy a condition:

$$1.80 < |\Delta OPD2/\lambda 1| < 2.20.$$

14. The optical information read/write device according to claim 12, wherein the phase shift structure includes a second area outside the first area, and wherein the second area is configured to converge each of the laser beams with the first and second wavelengths on the recording surfaces of the first and second optical discs, and not to converge the laser beam with the third wavelength, and wherein the second area includes a step between each couple of the adjacent refractive surface zones, the steps giving at least one kind of optical path difference to an incident laser beam, and wherein an absolute value of a ratio of the at least one kind of optical path difference given by the steps in the second area to the wavelength λ1 of the first laser beam is different from the |ΔOPD2/λ1|.

15. The optical information read/write device according to claim 11, wherein the phase shift structure includes a second area outside the first area, and wherein the second area is configured to converge each of the laser beams with the first and second wavelengths on the recording surfaces of the first and second optical discs, and not to converge the laser beam with the third wavelength, and wherein the second area includes a step between each couple of the adjacent refractive surface zones, the steps giving at least one kind of optical path difference to an incident laser beam, and wherein an absolute value of the at least one kind of optical path difference given by the steps in the second area is different from an absolute value of the optical path difference given by the steps in the first area.

16. The optical information read/write device according to claim 15, which is configured to satisfy a condition:

$$f1 \times NA1 > f2 \times NA2,$$

where f1 and f2 represent focal lengths in the read/write operations on the first and second optical discs, respectively, wherein the phase shift structure includes a third area outside the second area, and wherein the third area is configured to converge only the laser beam with the first wavelength on the recording surface of the first optical disc, and not to converge the laser beams with the second and third wavelengths, and wherein the third area includes a step between each couple of the adjacent refractive surface zones, the steps giving at least one kind of optical path difference to an incident laser beam, and wherein an absolute value of the at least one kind of optical path difference given by the steps in the third area is different from the absolute value of the at least one kind of optical path difference given by the steps in the second area.

17. The optical information read/write device according to claim 15, which is configured to satisfy a condition:

$$f1 \times NA1 < f2 \times NA2,$$

where f1 and f2 represent focal lengths in the read/write operations on the first and second optical discs, respectively, wherein the phase shift structure includes a third area outside the second area, and wherein the third area is configured to converge only the laser beam with the first wavelength on the recording surface of the first optical disc, and not to converge the laser beams with the second and third wavelengths, and wherein the third area includes a step between each couple of the adjacent refractive surface zones, the steps giving at least one kind of optical path difference to an incident laser beam, and wherein an absolute value of the at least one kind of optical path difference given by the steps in the third area is different from the absolute value of the at least one kind of optical path difference given by the steps in the second area.

18. An optical information read/write device configured to perform read/write operations for reading and/or writing information on each of a plurality of kinds of optical discs using a corresponding one of a plurality of kinds of substantially collimated laser beams having different wavelengths, the optical information read/write device comprising an objective lens that has a phase shift structure on at least one surface of the objective lens that has a plurality of ring-shaped refractive surface zones into which the at least one surface is concentrically divided, wherein the plurality of kinds of laser beams includes three kinds of laser beams that have a first wavelength λ1 (nm), a second wavelength λ2 (nm), and a third wavelength λ3 (nm) according to a relationship λ1<λ2<λ3, respectively, and wherein the plurality of kinds of optical discs includes:
a first optical disc with a protective layer whose thickness t1 is approximately 0.6 mm, on which the read/write operations are performed using the laser beam with the first wavelength λ1;
a second optical disc with a protective layer whose thickness t2 is approximately 0.6 mm, on which the read/write operations are performed using the laser beam with the second wavelength λ2; and
a third optical disc with a protective layer whose thickness is approximately 1.2 mm, on which the read/write operations are performed using the laser beam with the third wavelength λ3, and
wherein the optical information read/write device is configured to satisfy relationships NA1>NA3 and NA2>NA3, where NA1, NA2, and NA3 represent numerical apertures necessary for the read/write operations on the first optical disc, the second optical disc, and the third optical disc, respectively, and
wherein the objective lens is made of material with an Abbe number νd satisfying a condition:

40≦νd≦80, and wherein the phase shift structure has at least two kinds of steps, each of the steps between each couple of the adjacent refractive surface zones giving an optical path difference to an incident laser beam, and
wherein the phase shift structure is configured to satisfy a condition:

5.07<|ΔOPD1/λ1|<5.25, in a first area configured to converge the laser beam with the third wavelength λ3 on a recording surface of the third optical disc, where ΔOPD1 (nm) represents the optical path difference that at least one of the at least two kinds of steps give to the laser beam with the first wavelength λ1.

19. The optical information read/write device according to claim 18,
wherein the phase shift structure is configured to satisfy a condition:

2.50<|ΔOPD1/λ3|<2.58.

20. The optical information read/write device according to claim 19,
wherein the phase shift structure is configured to satisfy a condition:

2N−0.20<|ΔOPD2/λ1|<2N+0.20, where ΔOPD2 represents an optical path difference that the other of the at least two kinds of steps give to the laser beam with the first wavelength λ1.

21. The optical information read/write device according to claim 20,
wherein the phase shift structure is configured to satisfy a condition:

1.80<|ΔOPD2/λ1|<2.20.

22. The optical information read/write device according to claim 20,
wherein the phase shift structure includes a second area outside the first area, and wherein the second area is configured to converge each of the laser beams with the first and second wavelengths on the recording surfaces of the first and second optical discs, and not to converge the laser beam with the third wavelength, and
wherein the second area includes a step between each couple of the adjacent refractive surface zones, the steps giving at least one kind of optical path difference to an incident laser beam, and
wherein an absolute value of a ratio of the at least one kind of optical path difference given by the steps in the second area to the wavelength λ1 of the first laser beam is different from the |ΔOPD2/λ1|.

23. The optical information read/write device according to claim 19,
wherein the phase shift structure includes a second area outside the first area, and
wherein the second area is configured to converge each of the laser beams with the first and second wavelengths on the recording surfaces of the first and second optical discs, and not to converge the laser beam with the third wavelength, and
wherein the second area includes a step between each couple of the adjacent refractive surface zones, the steps giving at least one kind of optical path difference to an incident laser beam, and
wherein an absolute value of the at least one kind of optical path difference given by the steps in the second area is different from an absolute value of the optical path difference given by the steps in the first area.

24. The optical information read/write device according to claim 23,
which is configured to satisfy a condition:

$f1 \times NA1 > f2 \times NA2$, where f1 and f2 represent focal lengths in the read/write operations on the first and second optical discs, respectively,
wherein the phase shift structure includes a third area outside the second area, and
wherein the third area is configured to converge only the laser beam with the first wavelength on the recording surface of the first optical disc, and not to converge the laser beams with the second and third wavelengths, and
wherein the third area includes a step between each couple of the adjacent refractive surface zones, the steps giving at least one kind of optical path difference to an incident laser beam, and
wherein an absolute value of the at least one kind of optical path difference given by the steps in the third area is different from the absolute value of the at least one kind of optical path difference given by the steps in the second area.

25. The optical information read/write device according to claim 23,
which is configured to satisfy a condition:

$f1 \times NA1 < f2 \times NA2$, where f1 and f2 represent focal lengths in the read/write operations on the first and second optical discs, respectively,
wherein the phase shift structure includes a third area outside the second area, and
wherein the third area is configured to converge only the laser beam with the first wavelength on the recording surface of the first optical disc, and not to converge the laser beams with the second and third wavelengths, and wherein the third area includes a step between each couple of the adjacent refractive surface zones, the steps giving at least one kind of optical path difference to an incident laser beam, and wherein an absolute value of the at least one kind of optical path difference given by the steps in the third area is different from the absolute value of the at least one kind of optical path difference given by the steps in the second area.

26. An objective lens to be employed for an optical information read/write device that is configured to perform read/write operations for reading and/or writing information on each of a plurality of kinds of optical discs using a corresponding one of a plurality of kinds of laser beams having different wavelengths, the plurality of kinds of laser beams including three kinds of laser beams that have a first wavelength λ1 (nm), a second wavelength λ2 (nm), and a third wavelength λ3 (nm) according to a relationship λ1<λ2<λ3, respectively, the objective lens comprising a phase shift structure on at least one surface of the objective lens that has a plurality of ring-shaped refractive surface zones into which the at least one surface is concentrically divided, wherein the objective lens is a single lens made of material with an Abbe number νd satisfying a condition:

20≦νd<40, and wherein the phase shift structure has a step between each couple of the adjacent refractive surface zones that gives an optical path difference to an incident laser beam, and wherein the phase shift structure is configured to satisfy a condition:

2N+0.70<|ΔOPD/λ1|<2N+1.25, where ΔOPD represents the optical path difference (nm) that the step gives to the laser beam with the first wavelength λ1, and N represents a non-negative integer.

27. The objective lens according to claim 26, wherein the phase shift structure is configured to satisfy a condition:

2.80<|ΔOPD/λ1|<3.10.

28. The objective lens according to claim 26, wherein the phase shift structure is configured to satisfy a condition:

1.30<|ΔOPD/λ3|<1.47.

29. The objective lens according to claim 26, wherein the phase shift structure is configured to satisfy a condition:

4.80<|ΔOPD/λ1|<5.20.

30. The objective lens according to claim 26, wherein the phase shift structure is configured to satisfy a condition:

2.27<|ΔOPD/λ3|<2.46.

31. An optical information read/write device configured to perform read/write operations for reading and/or writing information on each of a plurality of kinds of optical discs using a corresponding one of a plurality of kinds of laser beams having different wavelengths, the optical information read/write device comprising the objective lens according to claim 26, wherein the plurality of kinds of laser beams includes three kinds of laser beams that have a first wavelength λ1 (nm), a second wavelength λ2 (nm), and a third wavelength λ3 (nm) according to a relationship λ1<λ2<λ3, respectively, and wherein the plurality of kinds of optical discs includes:

a first optical disc with a protective layer whose thickness t1 is approximately 0.6 mm, on which the read/write operations are performed using the laser beam with the first wavelength λ1;

a second optical disc with a protective layer whose thickness t2 is approximately 0.6 mm, on which the read/write operations are performed using the laser beam with the second wavelength λ2; and a third optical disc with a protective layer whose thickness is approximately 1.2 mm, on which the read/write operations are performed using the laser beam with the third wavelength λ3, and wherein the optical information read/write device is configured to satisfy relationships NA1<NA3 and NA2<NA3, where NA1, NA2, and NA3 represent numerical apertures necessary for the read/write operations on the first optical disc, the second optical disc, and the third optical disc, respectively, and wherein the optical information read/write device is configured such that the laser beams with the first and second wavelengths λ1 and λ2 are incident on the objective lens substantially as collimated light, and the laser beam with the third wavelength λ3 is incident on the objective lens as diverging light, and wherein the objective lens is made of material with an Abbe number νd satisfying a condition:

20≦νd<40, and wherein the phase shift structure has a step between each couple of the adjacent refractive surface zones that gives an optical path difference to an incident laser beam, and wherein the phase shift structure is configured to satisfy a condition:

2N+0.70<|ΔOPD/λ1|<2N+1.25, in a first area configured to converge the laser beam with the third wavelength λ3 on a recording surface of the third optical disc, where ΔOPD (nm) represents the optical path difference that the step gives to the laser beam with the first wavelength λ1, and N represents a non-negative integer.

32. The optical information read/write device according to claim 31, which is configured to satisfy conditions:

−0.02<f1×M1<0.02;

−0.02<f2×M2<0.02; and

−0.38<f3×M3<−0.30, where M1 and f1 represent an imaging magnification and a focal length in the read/write operations on the first optical disc, respectively, and M2 and f2 represent an imaging magnification and a focal length in the read/write operations on the second optical disc, respectively, and M3 and f3 represent an imaging magnification and a focal length in the read/write operations on the third optical disc, respectively, wherein the phase shift structure is configured to satisfy a condition:

2.80<|ΔOPD/λ1|<3.10.

33. The optical information read/write device according to claim 31, wherein the phase shift structure is configured to satisfy a condition:

1.30<|ΔOPD/λ3|<1.47.

34. The optical information read/write device according to claim 31,
wherein the phase shift structure includes a second area outside the first area, and
wherein the second area is configured to converge each of the laser beams with the first and second wavelengths on the recording surfaces of the first and second optical discs, and not to converge the laser beam with the third wavelength, and
wherein the second area includes a step between each couple of the adjacent refractive surface zones, the steps giving at least one kind of optical path difference to an incident laser beam, and
wherein an absolute value of the at least one kind of optical path difference given by the steps in the second area is different from an absolute value of the optical path difference given by the steps in the first area.

35. The optical information read/write device according to claim 34,
which is configured to satisfy a condition:

$f1 \times NA1 > f2 \times NA2$, where f1 and f2 represent focal lengths in the read/write operations on the first and second optical discs, respectively,
wherein the phase shift structure includes a third area outside the second area, and
wherein the third area is configured to converge only the laser beam with the first wavelength on the recording surface of the first optical disc, and not to converge the laser beams with the second and third wavelengths, and
wherein the third area includes a step between each couple of the adjacent refractive surface zones, the steps giving at least one kind of optical path difference to an incident laser beam, and
wherein an absolute value of the at least one kind of optical path difference given by the steps in the third area is different from the absolute value of the at least one kind of optical path difference given by the steps in the second area.

36. The optical information read/write device according to claim 34,
which is configured to satisfy a condition:

$f1 \times NA1 < f2 \times NA2$, where f1 and f2 represent focal lengths in the read/write operations on the first and second optical discs, respectively,
wherein the phase shift structure includes a third area outside the second area, and
wherein the third area is configured to converge only the laser beam with the first wavelength on the recording surface of the first optical disc, and not to converge the laser beams with the second and third wavelengths, and
wherein the third area includes a step between each couple of the adjacent refractive surface zones, the steps giving at least one kind of optical path difference to an incident laser beam, and
wherein an absolute value of the at least one kind of optical path difference given by the steps in the third area is different from the absolute value of the at least one kind of optical path difference given by the steps in the second area.

37. An optical information read/write device configured to perform read/write operations for reading and/or writing information on each of a plurality of kinds of optical discs using a corresponding one of a plurality of kinds of substantially collimated laser beams having different wavelengths, the optical information read/write device comprising the objective lens according to claim 26,
wherein the plurality of kinds of laser beams includes three kinds of laser beams that have a first wavelength λ1 (nm), a second wavelength λ2 (nm), and a third wavelength λ3 (nm) according to a relationship λ1<λ2<λ3, respectively, and
wherein the plurality of kinds of optical discs includes:
a first optical disc with a protective layer whose thickness t1 is approximately 0.6 mm, on which the read/write operations are performed using the laser beam with the first wavelength λ1;
a second optical disc with a protective layer whose thickness t2 is approximately 0.6 mm, on which the read/write operations are performed using the laser beam with the second wavelength λ2; and
a third optical disc with a protective layer whose thickness is approximately 1.2 mm, on which the read/write operations are performed using the laser beam with the third wavelength λ3, and
wherein the optical information read/write device is configured to satisfy relationships NA1>NA3 and NA2>NA3, where NA1, NA2, and NA3 represent numerical apertures necessary for the read/write operations on the first optical disc, the second optical disc, and the third optical disc, respectively, and
wherein the objective lens is made of material with an Abbe number νd satisfying a condition:

$20 \leq \nu d < 40$, and wherein the phase shift structure has at least two kinds of steps, each of the steps between each couple of the adjacent refractive surface zones giving an optical path difference to an incident laser beam, and
wherein the phase shift structure is configured to satisfy a condition:

$2N+0.70 < |\Delta OPD1/\lambda 1| < 2N+1.25$, in a first area configured to converge the laser beam with the third wavelength λ3 on a recording surface of the third optical disc, where ΔOPD1 (nm) represents the optical path difference that at least one of the at least two kinds of steps give to the laser beam with the first wavelength λ1, and N represents a non-negative integer.

38. The optical information read/write device according to claim 37,
wherein the phase shift structure is configured to satisfy a condition:

$2.80 < |\Delta OPD1/\lambda 1| < 3.10$.

39. The optical information read/write device according to claim 37,
wherein the phase shift structure is configured to satisfy a condition:

$1.30 < |\Delta OPD1/\lambda 3| < 1.47$.

40. The optical information read/write device according to claim 37,
wherein the phase shift structure is configured to satisfy a condition:

$4.80 < |\Delta OPD1/\lambda 1| < 5.20$.

41. The optical information read/write device according to claim 37,
wherein the phase shift structure is configured to satisfy a condition:

$$2.27 < |\Delta OPD1/\lambda 3| < 2.46.$$

42. The optical information read/write device according to claim 37,
wherein the phase shift structure is configured to satisfy a condition:

$$2N-0.20 < |\Delta OPD2/\lambda 1| < 2N+0.20,$$

where $\Delta OPD2$ represents an optical path difference that the other of the at least two kinds of steps give to the laser beam with the first wavelength $\lambda 1$.

43. The optical information read/write device according to claim 42,
wherein the phase shift structure is configured to satisfy a condition:

$$1.80 < |\Delta OPD2/\lambda 1| < 2.20.$$

44. The optical information read/write device according to claim 42,
wherein the phase shift structure includes a second area outside the first area, and
wherein the second area is configured to converge each of the laser beams with the first and second wavelengths on the recording surfaces of the first and second optical discs, and not to converge the laser beam with the third wavelength, and
wherein the second area includes a step between each couple of the adjacent refractive surface zones, the steps giving at least one kind of optical path difference to an incident laser beam, and
wherein an absolute value of a ratio of the at least one kind of optical path difference given by the steps in the second area to the wavelength $\lambda 1$ of the first laser beam is different from the $|\Delta OPD2/\lambda 1|$.

45. The optical information read/write device according to claim 37,
wherein the phase shift structure includes a second area outside the first area, and
wherein the second area is configured to converge each of the laser beams with the first and second wavelengths on the recording surfaces of the first and second optical discs, and not to converge the laser beam with the third wavelength, and
wherein the second area includes a step between each couple of the adjacent refractive surface zones, the steps giving at least one kind of optical path difference to an incident laser beam, and
wherein an absolute value of the at least one kind of optical path difference given by the steps in the second area is different from an absolute value of the optical path difference given by the steps in the first area.

46. The optical information read/write device according to claim 45,
which is configured to satisfy a condition:

$$f1 \times NA1 > f2 \times NA2,$$

where f1 and f2 represent focal lengths in the read/write operations on the first and second optical discs, respectively,
wherein the phase shift structure includes a third area outside the second area, and
wherein the third area is configured to converge only the laser beam with the first wavelength on the recording surface of the first optical disc, and not to converge the laser beams with the second and third wavelengths, and
wherein the third area includes a step between each couple of the adjacent refractive surface zones, the steps giving at least one kind of optical path difference to an incident laser beam, and
wherein an absolute value of the at least one kind of optical path difference given by the steps in the third area is different from the absolute value of the at least one kind of optical path difference given by the steps in the second area.

47. The optical information read/write device according to claim 45,
which is configured to satisfy a condition:

$$f1 \times NA1 < f2 \times NA2,$$

where f1 and f2 represent focal lengths in the read/write operations on the first and second optical discs, respectively,
wherein the phase shift structure includes a third area outside the second area, and
wherein the third area is configured to converge only the laser beam with the first wavelength on the recording surface of the first optical disc, and not to converge the laser beams with the second and third wavelengths, and
wherein the third area includes a step between each couple of the adjacent refractive surface zones, the steps giving at least one kind of optical path difference to an incident laser beam, and
wherein an absolute value of the at least one kind of optical path difference given by the steps in the third area is different from the absolute value of the at least one kind of optical path difference given by the steps in the second area.

* * * * *